(12) United States Patent
Khoshnevisan et al.

(10) Patent No.: US 12,495,414 B2
(45) Date of Patent: Dec. 9, 2025

(54) OVERLAPPING PHYSICAL UPLINK CONTROL CHANNEL AND PHYSICAL UPLINK SHARED CHANNEL TRANSMISSIONS

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 693 days.

(21) Appl. No.: 17/946,957

(22) Filed: Sep. 16, 2022

(65) Prior Publication Data
US 2024/0098735 A1    Mar. 21, 2024

(51) Int. Cl.
*H04W 72/1268* (2023.01)
*H04L 5/00* (2006.01)
*H04W 72/20* (2023.01)

(52) U.S. Cl.
CPC ....... *H04W 72/1268* (2013.01); *H04L 5/0051* (2013.01); *H04W 72/20* (2023.01)

(58) Field of Classification Search
CPC . H04W 72/1268; H04W 72/20; H04W 72/23; H04L 5/0051; H04L 5/0035;
(Continued)

(56) References Cited

U.S. PATENT DOCUMENTS

2019/0132896 A1*  5/2019  Kusashima ............... H04L 5/14
2023/0118905 A1*  4/2023  Go ........................ H04L 5/0044
                                                    370/329

FOREIGN PATENT DOCUMENTS

EP          4124141 A1    1/2023
WO    WO-2021187823 A1    9/2021
(Continued)

OTHER PUBLICATIONS

WO 2023211067—Lim et al.—with translation (Year: 2023).*
International Search Report and Written Opinion—PCT/US2023/071079—ISA/EPO—Nov. 24, 2023.

*Primary Examiner* — Rina C Pancholi
(74) *Attorney, Agent, or Firm* — Holland & Hart LLP

(57) ABSTRACT

Methods, systems, and devices for wireless communications are described. A user equipment (UE) may receive control signaling scheduling a physical uplink control channel (PUCCH) transmission and a physical uplink shared channel (PUSCH) transmission that overlap in the time domain. The UE may simultaneously transmit the PUSCH and PUCCH transmissions if the scheduled quantity of layers for the PUSCH transmission (or the scheduled quantity of layers for the PUSCH transmission and the PUCCH transmission) does not exceed an indicated maximum quantity of layers for PUSCH transmissions (or PUSCH and PUCCH transmissions). For a codebook based PUSCH transmission, the UE may simultaneously transmit the PUSCH and PUCCH transmissions if the scheduled quantity of antenna ports for the PUSCH transmission (or the scheduled quantity of antenna ports for the PUSCH transmission and the PUCCH transmission) does not exceed an indicated maximum quantity of ports for PUSCH transmissions (or PUSCH and PUCCH transmissions).

30 Claims, 16 Drawing Sheets

(58) Field of Classification Search
CPC ... H04L 5/0023; H04L 5/0044; H04L 5/0053; H04B 7/022; H04B 7/0404; H04B 7/0456; H04B 7/06952
See application file for complete search history.

(56) References Cited

FOREIGN PATENT DOCUMENTS

WO     WO-2022029728 A1     2/2022
WO     WO-2023211067 A1 * 11/2023     ......... H04L 5/0094

* cited by examiner

OVERLAPPING PHYSICAL UPLINK CONTROL CHANNEL AND PHYSICAL UPLINK SHARED CHANNEL TRANSMISSIONS

FIELD OF TECHNOLOGY

The following relates to wireless communications, including overlapping physical uplink control channel and physical uplink shared channel transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support overlapping physical uplink control channel (PUCCH) and physical uplink shared channel (PUSCH) transmissions. For example, the described techniques provide for transmission of overlapping PUCCH and PUSCH transmissions in accordance with conditions relating to how many layers may be used for PUSCH transmissions and/or PUCCH transmissions. In some aspects, a user equipment (UE) may receive control signaling from the network scheduling a PUCCH transmission and a PUSCH transmission that overlap in the time domain. In some examples, the UE may simultaneously transmit the PUSCH transmission and the PUCCH transmission if the scheduled quantity of layers for the PUSCH transmission (or the scheduled quantity of layers for the PUSCH transmission and the PUCCH transmission) does not exceed an indicated maximum quantity of layers for PUSCH transmissions (or PUSCH and PUCCH transmissions). In some examples, for a codebook based PUSCH transmission, the UE may simultaneously transmit the PUSCH transmission and the PUCCH transmission if the scheduled quantity of antenna ports for the PUSCH transmission (or the scheduled quantity of antenna ports for the PUSCH transmission and the PUCCH transmission) does not exceed an indicated maximum quantity of ports for PUSCH transmissions (or PUSCH and PUCCH transmissions).

A method is described. The method may include communicating, with a network entity, first control signaling indicating a maximum quantity of layers associated with uplink shared channel transmissions overlapping in the time domain with uplink control channel transmissions for the UE, receiving, from the network entity, second control signaling scheduling an uplink control channel transmission associated with a first control resource set (CORESET) pool index, receiving, from the network entity, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission, and transmitting at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

A UE is described. The UE may include a processor, memory coupled with the processor, and instructions stored in the memory. The instructions may be executable by the processor to cause the UE to communicate, with a network entity, first control signaling indicating a maximum quantity of layers associated with uplink shared channel transmissions overlapping in the time domain with uplink control channel transmissions for the UE, receive, from the network entity, second control signaling scheduling an uplink control channel transmission associated with a first CORESET pool index, receive, from the network entity, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission, and transmit at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

Another apparatus is described. The apparatus may include means for communicating, with a network entity, first control signaling indicating a maximum quantity of layers associated with uplink shared channel transmissions overlapping in the time domain with uplink control channel transmissions for the UE, means for receiving, from the network entity, second control signaling scheduling an uplink control channel transmission associated with a first CORESET pool index, means for receiving, from the network entity, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission, and means for transmitting at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

A non-transitory computer-readable medium storing code is described. The code may include instructions executable by a processor to communicate, with a network entity, first control signaling indicating a maximum quantity of layers associated with uplink shared channel transmissions overlapping in the time domain with uplink control channel transmissions for the UE, receive, from the network entity, second control signaling scheduling an uplink control channel transmission associated with a first CORESET pool index, receive, from the network entity, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission, and transmit at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

In some examples of the method, UE, apparatuses, and non-transitory computer-readable medium described herein, communicating the first control signaling may include operations, features, means, or instructions for communicating an indication of a maximum quantity of ports associated with uplink shared channel transmissions overlapping in the time domain with uplink control channel transmissions for the UE, where the third control signaling indicates a quantity of ports associated with the uplink shared channel transmission, and where transmitting at least one of the uplink control channel transmission or the uplink shared channel transmission may be based on the maximum quantity of ports and the quantity of ports associated with the uplink shared channel transmission.

In some examples of the method, apparatuses, and non-transitory computer-readable medium described herein, the uplink shared channel transmission includes a codebook based uplink shared channel transmission.

Some examples of the method, UE, apparatuses, and non-transitory computer-readable medium described herein may further include operations, features, means, or instructions for determining that the quantity of layers associated with the uplink shared channel transmission exceeds the maximum quantity of layers, selecting a subset of layers of the quantity of layers based on the determining, where a second quantity of layers corresponding to the subset of layers corresponds to the maximum quantity of layers, and transmitting the uplink control channel transmission and the uplink shared channel transmission via the subset of layers.

In some examples of the method, UE, apparatuses, and non-transitory computer-readable medium described herein, receiving the third control signaling may include operations, features, means, or instructions for receiving an indication of a set of sounding reference signal resources or a set of demodulation reference signal ports corresponding to the quantity of layers, and where selecting the subset of layers includes selecting a subset of the set of sounding reference signal resources or a subset of the set of demodulation reference signal ports.

Some examples of the method, UE, apparatuses, and non-transitory computer-readable medium described herein may further include operations, features, means, or instructions for determining that the quantity of layers associated with the uplink shared channel transmission exceeds the maximum quantity of layers, where transmitting at least one of the uplink control channel transmission or the uplink shared channel transmission includes transmitting one of the uplink control channel transmission or the uplink shared channel transmission and dropping one of the uplink control channel transmission or the uplink shared channel transmission based on the determining.

Some examples of the method, UE, apparatuses, and non-transitory computer-readable medium described herein may further include operations, features, means, or instructions for selecting to drop one of the uplink control channel transmission or the uplink shared channel transmission based on the one being associated with a fixed CORESET pool index, the one having a lower priority, the one being the uplink control channel transmission and carrying a channel state information report, the one being the uplink shared channel transmission and the uplink control channel transmission carrying hybrid automatic repeat request feedback information, the one being scheduled for transmission later in time, or the one being scheduled for periodic or semi-static transmission.

Some examples of the method, UE, apparatuses, and non-transitory computer-readable medium described herein may further include operations, features, means, or instructions for determining that the quantity of layers associated with the uplink shared channel transmission exceeds the maximum quantity of layers and multiplexing information associated with the uplink control channel transmission onto the uplink shared channel transmission based on the determining, where transmitting at least one of the uplink control channel transmission or the uplink shared channel transmission includes transmitting the uplink shared channel transmission.

Some examples of the method, UE, apparatuses, and non-transitory computer-readable medium described herein may further include operations, features, means, or instructions for determining, based on first communications resources associated with the uplink control channel transmission and second communications resources associated with the uplink shared channel transmission, that the uplink shared channel transmission at least partially overlaps in the time domain with the uplink control channel transmission, where the second control signaling indicates the first communications resources, where the third control signaling indicates the second communications resources, and where transmitting at least one of the uplink control channel transmission or the uplink shared channel transmission may be based on the determining.

In some examples of the method, UE, apparatuses, and non-transitory computer-readable medium described herein, receiving the third control signaling may include operations, features, means, or instructions for receiving an indication that the uplink shared channel transmission at least partially overlaps in the time domain with the uplink control channel transmission, where transmitting at least one of the uplink control channel transmission or the uplink shared channel transmission may be based on the indication.

In some examples of the method, UE, apparatuses, and non-transitory computer-readable medium described herein, communicating the first control signaling may include operations, features, means, or instructions for receiving the first control signaling from the network entity.

In some examples of the method, UE, apparatuses, and non-transitory computer-readable medium described herein, communicating the first control signaling may include operations, features, means, or instructions for transmitting an indication of a UE capability corresponding to the maximum quantity of layers.

In some examples of the method, UE, apparatuses, and non-transitory computer-readable medium described herein, the maximum quantity of layers includes a total quantity of layers for uplink control channel transmissions and uplink shared channel transmissions and the uplink control channel transmission may be associated with one layer.

A method for wireless communications at a network entity is described. The method may include communicating, with a UE, first control signaling indicating a maximum quantity of layers associated with uplink shared channel transmissions overlapping in the time domain with uplink control channel transmissions for the UE, transmitting, to the UE, second control signaling scheduling an uplink control channel transmission associated with a first CORESET pool index, transmitting, to the UE, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission, and receiving, from the UE, at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

A network entity is described. The network entity may include a processor, memory coupled with the processor, and instructions stored in the memory. The instructions may be executable by the processor to cause the network entity to communicate, with a UE, first control signaling indicating a maximum quantity of layers associated with uplink shared channel transmissions overlapping in the time domain with uplink control channel transmissions for the UE, transmit, to the UE, second control signaling scheduling an uplink control channel transmission associated with a first CORESET pool index, transmit, to the UE, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission, and receive, from the UE, at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

Another apparatus for wireless communications at a network entity is described. The apparatus may include means for communicating, with a UE, first control signaling indicating a maximum quantity of layers associated with uplink shared channel transmissions overlapping in the time domain with uplink control channel transmissions for the UE, means for transmitting, to the UE, second control signaling scheduling an uplink control channel transmission associated with a first CORESET pool index, means for transmitting, to the UE, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission, and means for receiving, from the UE, at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

A non-transitory computer-readable medium storing code for wireless communications at a network entity is described. The code may include instructions executable by a processor to communicate, with a UE, first control signaling indicating a maximum quantity of layers associated with uplink shared channel transmissions overlapping in the time domain with uplink control channel transmissions for the UE, transmit, to the UE, second control signaling scheduling an uplink control channel transmission associated with a first CORESET pool index, transmit, to the UE, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission, and receive, from the UE, at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

In some examples of the method, network entity, apparatuses, and non-transitory computer-readable medium described herein, communicating the first control signaling may include operations, features, means, or instructions for communicating an indication of a maximum quantity of ports associated with uplink shared channel transmissions overlapping in the time domain with uplink control channel transmissions for the UE, where the third control signaling indicates a quantity of ports associated with the uplink shared channel transmission, and where receiving at least one of the uplink control channel transmission or the uplink shared channel transmission may be based on the maximum quantity of ports and the quantity of ports associated with the uplink shared channel transmission.

In some examples of the method, network entity, apparatuses, and non-transitory computer-readable medium described herein, the uplink shared channel transmission includes a codebook based uplink shared channel transmission.

Some examples of the method, network entity, apparatuses, and non-transitory computer-readable medium described herein may further include operations, features, means, or instructions for receiving the uplink control channel transmission and the uplink shared channel transmission via a subset of layers of the quantity of layers, where the quantity of layers associated with the uplink shared channel transmission exceeds the maximum quantity of layers, and where a second quantity of layers corresponding to the subset of layers corresponds to the maximum quantity of layers.

In some examples of the method, network entity, apparatuses, and non-transitory computer-readable medium described herein, transmitting the third control signaling may include operations, features, means, or instructions for transmitting an indication of a set of sounding reference signal resources or a set of demodulation reference signal ports corresponding to the quantity of layers.

In some examples of the method, network entity, apparatuses, and non-transitory computer-readable medium described herein, receiving at least one of the uplink control channel transmission or the uplink shared channel transmission may include operations, features, means, or instructions for receiving one of the uplink control channel transmission or the uplink shared channel transmission, where the quantity of layers associated with the uplink shared channel transmission exceeds the maximum quantity of layers.

In some examples of the method, network entity, apparatuses, and non-transitory computer-readable medium described herein, receiving at least one of the uplink control channel transmission or the uplink shared channel transmission may include operations, features, means, or instructions for receiving the uplink shared channel transmission with information associated with the uplink control channel transmission multiplexed onto the uplink shared channel transmission, where the quantity of layers associated with the uplink shared channel transmission exceeds the maximum quantity of layers.

In some examples of the method, network entity, apparatuses, and non-transitory computer-readable medium described herein, transmitting the third control signaling may include operations, features, means, or instructions for transmitting an indication that the uplink shared channel transmission at least partially overlaps in the time domain with the uplink control channel transmission, where transmitting at least one of the uplink control channel transmission or the uplink shared channel transmission may be based on the indication.

In some examples of the method, network entity, apparatuses, and non-transitory computer-readable medium described herein, communicating the first control signaling may include operations, features, means, or instructions for transmitting the first control signaling.

In some examples of the method, network entity, apparatuses, and non-transitory computer-readable medium described herein, communicating the first control signaling may include operations, features, means, or instructions for receiving an indication of a UE capability corresponding to the maximum quantity of layers.

In some examples of the method, network entity, apparatuses, and non-transitory computer-readable medium described herein, the maximum quantity of layers includes a total quantity of layers for uplink control channel transmissions and uplink shared channel transmissions and the uplink control channel transmission may be associated with one layer.

DETAILED DESCRIPTION

Figure 1:
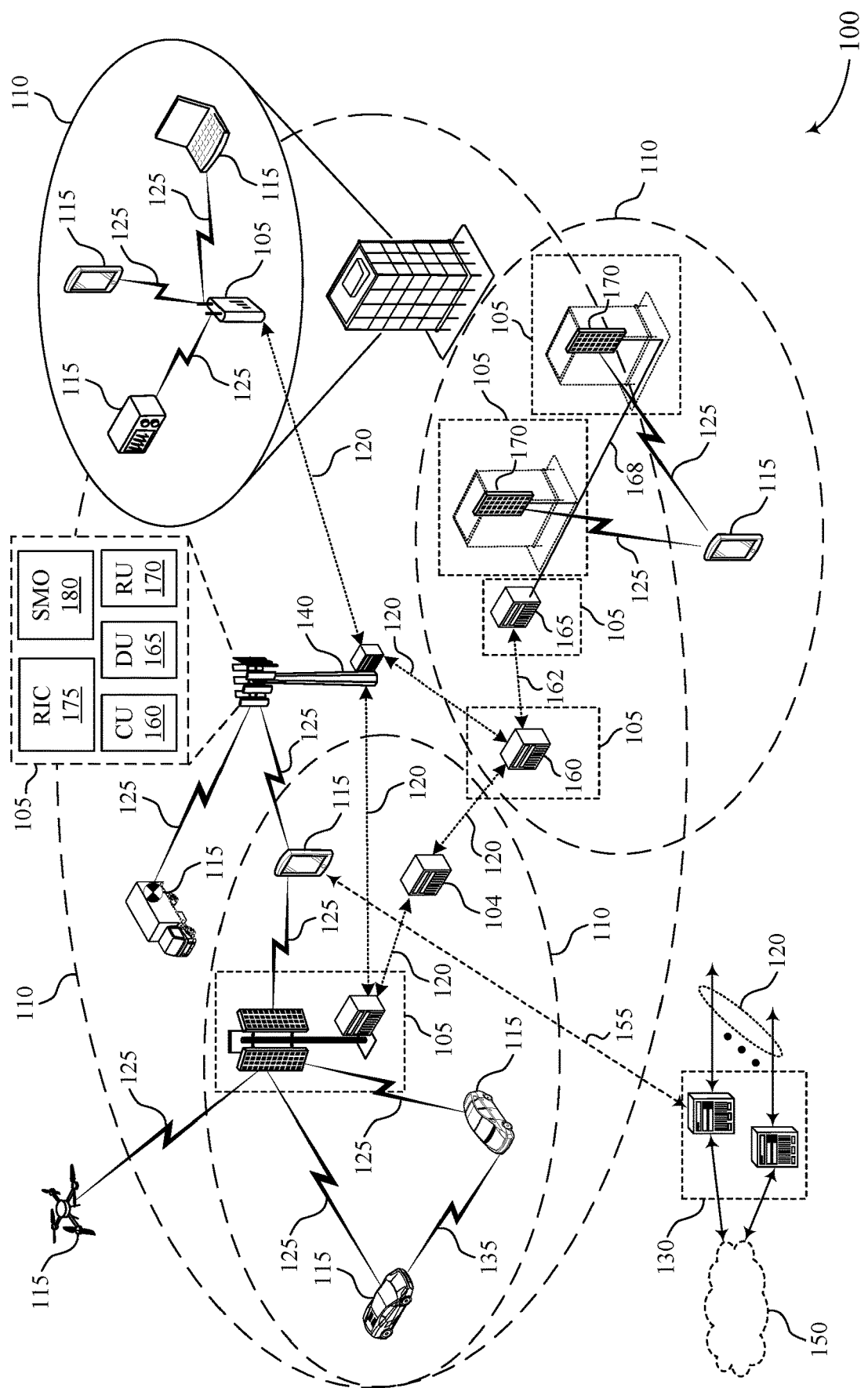
FIG. 1 illustrates an example of a wireless communications system that supports overlapping physical uplink control channel (PUCCH) and physical uplink shared channel (PUSCH) transmissions in accordance with one or more aspects of the present disclosure.

In wireless communications systems, a user equipment (UE) may transmit physical uplink shared channel (PUSCH) transmissions and physical uplink control channel (PUCCH) transmissions to a network entity. Some UEs may be capable of transmitting multiple uplink transmissions that at least partially overlap in the time domain in the same component carrier (CC). For example, a UE may be scheduled to transmit a PUCCH to a first transmission and reception point (TRP) that at least partially overlaps in time with a scheduled PUSCH transmission to a second TRP. From the UE perspective, TRP differentiation may be based on the control resource set (CORESET) pool index value associated with each uplink transmission. For both codebook based and non-codebook based PUSCH, a UE may be configured with a maximum quantity of layers (e.g., a rank), X', for PUSCH transmissions that overlap in the time domain with a PUCCH transmission. For codebook based PUSCH, a UE may be configured with a maximum quantity of PUSCH antenna ports for PUSCH transmissions that overlap in the time domain with a PUCCH transmission. A PUCCH transmission may be configured to use a single layer (e.g., a single antenna port for codebook based PUCCH).

The present disclosure relates to simultaneous transmission of PUSCH and PUCCH transmissions and schemes for managing overlapping PUSCH and PUCCH transmissions when conditions relating to a maximum quantity of layers/ and or antenna ports are not met. A UE may indicate to a network entity (e.g., via capability signaling), or the network entity may indicate to the UE (e.g., via radio resource control (RRC) signaling), a maximum quantity of layers (e.g., a rank) that the UE may support for PUSCH transmissions that overlap in the time domain with a PUCCH transmission. For codebook based PUSCH, the UE may also indicate to the network entity, or the network entity may indicate to the UE, a maximum quantity of antenna ports for PUSCH transmissions that overlap in the time domain with a PUCCH transmission. The UE may receive control signaling scheduling a PUCCH transmission and a PUSCH transmission that overlap in the time domain. The control signaling may indicate a quantity of layers for the PUSCH transmission (e.g., or a quantity of antenna ports for codebook based PUSCH).

In some examples, the UE may not expect the network entity to schedule an overlapping PUSCH transmission and PUCCH transmission where the scheduled quantity of layers (and/or antenna ports for codebook based PUSCH) exceed the maximum quantity of layers (and/or the maximum quantity of antenna ports for codebook based PUSCH). In some examples, if the quantity of scheduled PUSCH layers (e.g., or antenna ports for codebook based PUSCH) exceeds the configured maximum, the UE may reduce the quantity of layers of the scheduled PUSCH, for example, by selecting a subset of the indicated sounding reference signal (SRS) resources or demodulation reference signal (DMRS) ports to reduce the quantity of layers to the configured maximum. In some cases, if the quantity of scheduled PUSCH layers (e.g., or antenna ports for codebook based PUSCH) exceeds the configured maximum, the UE may drop either the scheduled PUSCH transmission or the scheduled PUCCH transmission. In some examples, if the quantity of PUSCH layers (e.g., or antenna ports for codebook based PUSCH) exceeds the configured maximum, the UE may multiplex the PUCCH content onto the PUSCH transmission and transmit the PUSCH transmission (and not the PUCCH transmission).

Aspects of the disclosure are initially described in the context of wireless communications systems. Aspects of the disclosure are additionally illustrated by and described with reference to multi-TRP transmission schemes and process flows. Aspects of the disclosure are further illustrated by and described with reference to apparatus diagrams, system diagrams, and flowcharts that relate to overlapping PUCCH and PUSCH transmissions.

FIG. 1 illustrates an example of a wireless communications system 100 that supports overlapping PUCCH and PUSCH transmissions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a TRP. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support overlapping PUCCH and PUSCH transmissions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In the wireless communications systems 100, a UE 115 may transmit PUSCH transmissions and PUCCH transmissions to one or more network entities 105. In some examples, a UE 115 may transmit multiple uplink transmissions that at least partially overlap in the time domain in a same CC. For example, the UE 115 may be scheduled to transmit a PUCCH transmission to a first TRP that at least partially overlaps in time with a scheduled PUSCH transmission to a second TRP based on the CORESET pool index value associated with each uplink transmission. For both codebook based and non-codebook based PUSCH, the UE 115 may be configured with a maximum quantity of layers, X', for PUSCH transmissions that overlap in the time domain with a PUCCH transmission. For codebook based PUSCH, the UE 115 may be configured with a maximum quantity of PUSCH antenna ports for PUSCH transmissions that overlap in the time domain with a PUCCH transmission. A PUCCH transmission may be configured to use a single layer (e.g., a single antenna port for codebook based PUSCH).

A UE 115 may indicate to a network entity 105 (e.g., via capability signaling), or the network entity 105 may indicate to the UE 115 (e.g., via RRC signaling), a maximum quantity of layers that the UE 115 may support for PUSCH transmissions that overlap in the time domain with a PUCCH transmission. For codebook based PUSCH, the UE 115 may also indicate to the network entity 105, or the network entity 105 may indicate to the UE, a maximum quantity of antenna ports for PUSCH transmissions that overlap in the time domain with a PUCCH transmission. The UE 115 may receive control signaling scheduling a PUCCH transmission and a PUSCH transmission that overlap in the time domain. The control signaling may indicate a quantity of layers for the PUSCH transmission (e.g., or a quantity of antenna ports for codebook based PUSCH).

In some examples, the UE 115 may not expect the network entity 105 to schedule an overlapping PUSCH transmission and PUCCH transmission where the scheduled quantity of layers (e.g., or antenna ports for codebook based PUSCH) exceed the maximum quantity of layers. In some examples, if the scheduled quantity of PUSCH layers (e.g., or antenna ports for codebook based PUSCH) exceeds the configured maximum, the UE 115 may reduce the quantity of layers of the scheduled PUSCH transmission, for example, by selecting a subset of the indicated SRS resources or DMRS ports to reduce the quantity of layers to the configured maximum. In some cases, if the scheduled quantity of PUSCH layers (e.g., or antenna ports for codebook based PUSCH) exceeds the configured maximum, the UE 115 may drop either the scheduled PUSCH transmission or the scheduled PUCCH transmission. In some examples, if the scheduled quantity of PUSCH layers (e.g., or antenna ports for codebook based PUSCH) exceeds the configured maximum, the UE 115 may multiplex the PUCCH content onto the PUSCH transmission and transmit the PUSCH transmission (and not the PUCCH transmission).

Figure 2:
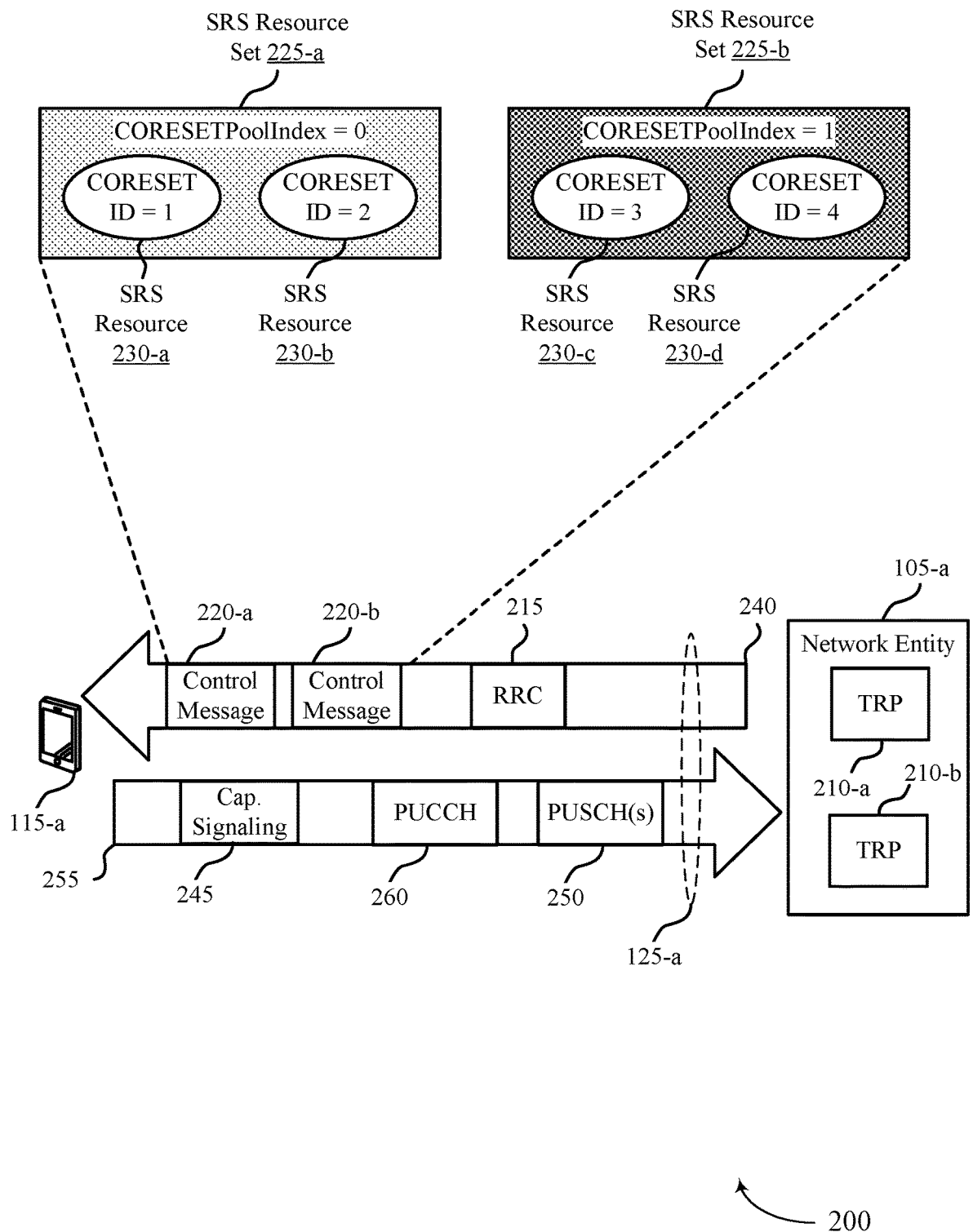
FIG. 2 illustrates an example of a wireless communications system that supports overlapping PUCCH and PUSCH transmissions in accordance with one or more aspects of the present disclosure.

FIG. 2 illustrates an example of a wireless communications system 200 that supports overlapping PUCCH and PUSCH transmissions in accordance with one or more aspects of the present disclosure. The wireless communications system 200 may implement or be implemented to realize or facilitate aspects of the wireless communications system 100. For example, the wireless communications system 200 includes a UE 115-a, which may be an example of a UE 115 as described herein. The wireless communications system 200 includes a network entity 105-a, which may be an example of a network entity 105 as described herein.

The UE 115-a may communicate with the network entity 105-a via a TRP 210-a and a TRP 210-b using a communication link 125-a, which may be an example of an NR or LTE link between the UE 115-a and the network entity 105-a. The communication link 125-a may include a bi-directional link that enables both uplink and downlink communication. For example, the UE 115-a may transmit uplink transmissions 255, such as uplink control signals or uplink data signals, to the network entity 105-a via the TRP 210-a or the TRP 210-b using the communication link 125-a and the network entity 105-a may transmit downlink transmissions 240, such as downlink control signals or downlink data signals, to the UE 115-a via the TRP 210-a or the TRP 210-b using the communication link 125-a. In some cases, the TRP 210-a and the TRP 210-b may be located at or associated with different network entities (e.g., the TRP 210-a may be located at or associated with the network entity 105-a and the TRP 210-b may located at or associated with another network entity 105).

In some examples, the UE 115-a and the network entity 105-a may support multi-downlink control information (DCI) based multi-TRP transmission. In some examples, the UE 115-a may receive a control message 220-a including a first DCI (transmitted from the TRP 210-a) that schedules a first uplink transmission to the TRP 210-a (e.g., a PUSCH transmission 250). In some examples, the UE 115-a may receive a control message 220-b including a second DCI (transmitted from the TRP 210-b) that schedules second uplink transmission to the TRP 210-b (e.g., a PUCCH transmission 260 or another PUSCH transmission).

In some examples, the UE 115-a may perform a TRP differentiation based on CORESET pool index values (e.g., CORESETPoolIndex). For example, the control message 220-a and the control message 220-b may include indications of a first SRS resource set 225-a and a second SRS resource set 225-b. The first SRS resource set 225-a may include SRS resource 230-a and SRS resource 230-b. The second SRS resource set 225-b may include SRS resource 230-c and SRS resource 230-d. The network entity 105-a may configure each CORESET (e.g., up to a maximum of 5 CORESETs) with a value of CORESETPoolIndex. The value of CORESETPoolIndex can be 0 or 1. This groups the CORESETs into two groups. A TRP may be associated with a CORESETPoolIndex value. For example, CORESET-PoolIndex=0 may be associated with the TRP 210-a and the CORESETPoolIndex=1 may be associated with the TRP 210-b. In some examples, the UE 115-a may be configured by the higher layer parameter PDCCH-Config (e.g., in RRC signaling 215) that includes two different values of CORE-SETPoolIndex in CORESETs for the active BWP of a serving cell.

In some examples, the PUSCH transmission 250 is associated with CORESETPoolIndex=0 and is transmitted using a first beam, a first transmission configuration indicator (TCI) state, first power control parameters, and/or a first precoder from a first UE panel toward TRP 210-a, and the PUCCH transmission 260 is associated with CORESET-PoolIndex=1 and is transmitted using a second beam, a second TCI state, second power control parameters, and/or a second precoder from a second UE panel toward TRP 210-b.

In some examples, uplink transmissions (e.g., the PUSCH transmission 250 and the PUCCH transmission 260) to different TRPs (e.g., the TRP 210-a and the TRP 210-b), where from the UE perspective, the uplink transmissions are associated with different CORESET pool index values, may be time domain multiplexed (TDMed) in a given CC or serving cell. In some examples, as described herein, uplink transmissions (e.g., the PUSCH transmission 250 and the PUCCH transmission 260) to different TRPs (e.g., the TRP 210-a and the TRP 210-b), where from the UE perspective, the uplink transmissions are associated with different CORESET pool index values, may at least partially overlap in the time domain (not TDMed).

In some wireless communications systems, when the scheduled PUSCH transmission 250 and the scheduled PUCCH transmission 260 in the same CC or serving cell are partially or fully overlapping in at least the time domain, the UE 115-a may transmit the PUSCH transmission 250 and the PUCCH transmission 260 simultaneously if the PUSCH transmission 250 and the PUCCH transmission 260 are associated with different CORESETPoolIndex values. The control messages (e.g., the control message 220-a and the control message 220-b) may indicate the CORESET pool index values associated with the PUSCH transmission 250 and the PUCCH transmission 260. Techniques described herein provide for multi-DCI based multi-TRP communications.

The UE 115-a may use a single layer (e.g., a single antenna port) for the PUCCH transmission 260. In some examples, the UE 115-a may support a maximum quantity of layers X' (e.g., rank) the UE 115-a may use for PUSCH transmissions overlapping in the time domain with a PUCCH transmission. In some examples, for both codebook-based and non-codebook based PUSCH transmissions, the maximum quantity of layers X' may not be applicable to simultaneous PUSCH transmissions (e.g., time-overlapping PUSCH transmissions to different TRPs without a time-overlapping PUCCH).

In some examples, the maximum quantity of layers may be configured as X'=min(X−1,Y) where X is a sum rank restriction (quantity of layers of the PUSCH+1<=X (because the PUCCH is configured to use a single layer)) and Y is a PUSCH rank restriction (quantity of layers of the PUSCH<=Y). Y corresponds to the maximum rank per CORESET pool index value in the presence of simultaneous transmission. X', X and/or Y may be indicated by a UE 115-a capability or may be RRC configured. For example, the UE 115-a may transmit capability signaling 245 indicating X, Y, or X', or the network entity 105-a may transmit an indication of X, Y, or X' in RRC signaling 215.

For codebook based PUSCH transmissions, the UE 115-a may be configured with a maximum quantity of PUSCH antenna ports P' the UE 115-a may use for PUSCH transmissions overlapping in the time domain with a PUCCH transmission. In some examples, the maximum quantity of antenna ports may be configured as P'=min(P−1,Q) where P is a sum quantity of ports restriction (quantity of PUSCH ports of the PUSCH+1<=P (because the PUCCH is configured to use a single antenna port)) and Q is a restriction of a quantity of PUSCH ports (quantity of PUSCH ports of the PUSCH<=Q). Q corresponds to the maximum quantity of antenna ports of the PUSCH per CORESET pool index value in the presence of simultaneous transmission with PUCCH. P', P and/or Q may be indicated by a UE 115-a in capability signaling or may be RRC configured. For example, the UE 115-a may transmit capability signaling 245 indicating P', P, or Q, or the network entity 105-a may transmit an indication of P', P, or Q in RRC signaling 215.

The UE 115-a and the network entity 105-a may communicate control signaling (e.g., RRC signaling 215 or UE capability signaling 245) indicating a maximum quantity of layers the UE 115-a may use for PUSCH transmissions overlapping in the time domain with a PUCCH transmission. For example, the control signaling may indicate X', X, and/or Y. In some examples, if the control signaling indicates X and/or Y, the UE 115-a (and/or the network entity 105-a) may determine X', as X'=min(X−1,Y). In some examples, the control signaling (e.g., the RRC signaling 215 or the UE capability signaling 245) may indicate a maximum quantity of antenna ports the UE 115-a may use for PUSCH transmissions overlapping in the time domain with a PUCCH transmission for codebook based transmissions. For example, the control signaling may indicate P', P, and/or Q. In some examples, if the control signaling indicates P and/or Q, the UE 115-a (and/or the network entity 105-a) may determine P', as P'=min(P−1,Q).

In some examples, the UE 115-a may receive a control message 220-b that schedules a PUCCH transmission 260. The control message 220-b may indicate that the PUCCH transmission 260 is associated with a first CORESET pool index value (e.g., CORESETPoolIndex=1). Accordingly, the network entity 105-a is scheduled to receive the PUCCH transmission 260 via the TRP 210-b. For example, the control message 220-b may include one or more SRS resource indicator fields indicating communication resources such as SRS Resource set 225-b associated with CORESETPoolIndex=1.

The UE 115-a may receive a control message 220-a that schedules a PUSCH transmission 250. The control message 220-a may indicate that the PUSCH transmission 250 is associated with a second CORESET pool index value (e.g., CORESETPoolIndex=0). Accordingly, the network entity 105-*a* is scheduled to receive the PUSCH transmission 250 via the TRP 210-*a*. For example, the control message 220-*a* may include one or more SRS resource indicator fields indicating communication resources such as SRS Resource set 225-*a* associated with CORESETPoolIndex=0. The control message 220-*a* scheduling the PUSCH transmission 250 may indicate a quantity of layers associated with the PUSCH transmission 250. In some examples, for codebook based PUSCH, the control message 220-*a* scheduling the PUSCH transmission 250 may indicate a quantity of antenna ports associated with the PUSCH transmission 250.

In some examples, the UE 115-*a* may not expect the network entity 105-*a* to schedule the PUSCH transmission 250 and the PUCCH transmission 260 that at least partially overlap in the time domain where the scheduled quantity of layers for the PUSCH transmission 250 (e.g., or antenna ports if the PUSCH transmission 250 is a codebook based PUSCH transmission) exceeds the configured maximum quantity of layers (e.g., or the configured maximum quantity of antenna ports if the PUSCH transmission 250 is a codebook based PUSCH transmission). In some examples, if the scheduled quantity of PUSCH layers (e.g., or antenna ports if the PUSCH transmission 250 is a codebook based PUSCH transmission) does not exceed the configured maximum, the UE 115-*a* may simultaneously transmit the PUSCH transmission 250 associated with CORESET-PoolIndex=0 (e.g., to the TRP 210-*a*) and the PUCCH transmission 260 associated with CORESETPoolIndex=1 (e.g., to the TRP 210-*b*). In some examples, the UE 115-*a* may be configured not to multiplex the PUCCH content (e.g., uplink control information (UCI)) in the PUSCH transmission 250. For example, the UE 115-*a* may transmit the PUSCH transmission 250 and the PUCCH transmission 260 separately and simultaneously (e.g., at least partially overlapping in time).

In some examples, simultaneous transmission of the PUSCH transmission 250 and the PUCCH transmission 260 may be used in situations where one or both of the PUSCH transmission 250 and the PUCCH transmission 260 are scheduled dynamically by a DCI (e.g., the control message 220-*a* and/or the control message 220-*b* is a DCI) as the network entity 105-*a* may avoid violating the maximum layer and/or antenna port restrictions via a backhaul communications between the TRP 210-*a* and the TRP 210-*b*. For example, both the PUSCH transmission 250 and PUCCH transmission 260 may be scheduled by a DCI, (e.g., the PUSCH transmission 250 may be a dynamic grant (DG) PUSCH and the PUCCH transmission 260 may be a dynamic HARQ acknowledgment (Ack)). As another example, only the PUSCH transmission 250 may be scheduled by a DCI (e.g., the PUSCH transmission 250 may be a DG-PUSCH and the PUCCH transmission 260 may be a periodic or semi-persistent (SP) scheduled channel state information (CSI) report or scheduling request, or a HARQ-Ack for an SP scheduled physical downlink shared channel (PDSCH)). As another example, only the PUCCH transmission may be scheduled by a DCI (e.g., the PUSCH transmission 250 may be a configured grant (CG) PUSCH and the PUCCH transmission 260 may be a dynamic HARQ-Ack).

In some examples, if the control message 220-*a* schedules a quantity of layers for the PUSCH transmission 250 that exceeds the indicated maximum quantity of layers, the UE 115-*a* may reduce the quantity of layers of the PUSCH transmission 250 to satisfy the configured maximum quantity of layers. For example, to reduce the quantity of layers for the PUSCH transmission 250, the UE 115-*a* may select a subset of the indicated SRS resources for a non-codebook based PUSCH transmission and a subset of DMRS ports corresponding to the reduced quantity of layers. For a codebook based PUSCH transmission, if the control message 220-*a* indicates a quantity of antenna ports for the PUSCH transmission 250 that exceed the configured maximum quantity of antenna ports, the UE 115-*a* may reduce the quantity of antenna ports, for example, by selecting a subset of the indicated SRS ports and a subset of the transmit precoding matrix index (TPMI) rows corresponding to the reduced the quantity of ports.

The UE 115-*a* may determine that the PUSCH transmission 250 at least partially overlaps in time with the PUCCH transmission 260. In some examples, the UE 115-*a* may determine that the PUSCH transmission 250 at least partially overlaps in time with the PUCCH transmission 260 based on the grants or configurations scheduling the PUSCH transmission 250 and the PUCCH transmission 260 (e.g., based on determining that scheduled time resources for the PUSCH transmission 250 overlap with scheduled time resources for the PUCCH transmission 260). In some examples, the control message 220-*a* that schedules the PUSCH transmission 250 may be a DCI, and the DCI may indicate that the PUSCH transmission at least partially overlaps in the time domain with the PUCCH transmission 260. For example, in the case that the PUCCH transmission 260 is also scheduled by a DCI (e.g., the control message 220-*b* is a DCI and the PUCCH transmission 260 is a dynamic HARQ-Ack), and the DCI scheduling the PUCCH transmission is missed, the UE 115-*a* may determine the quantity of layers and/or antenna ports for the PUSCH transmission incorrectly as the UE 115-*a* may incorrectly determine that there is no PUSCH/PUCCH overlap absent an explicit indication in the DCI scheduling the PUSCH transmission 250 (and therefore in some cases the PUSCH transmission may not be received by the network entity 105-*a*). In some cases, the network entity 105-*a* may indicate to the UE 115-*a* to reduce the quantity of layers or antenna ports in the DCI scheduling the PUSCH transmission 250 if the PUSCH transmission 250 is a DG-PUSCH (e.g., in the control message 220-*a*). In some examples, the network entity 105-*a* may assume that the UE 115-*a* autonomously reduces the quantity of layers and/or ports of the PUSCH transmission 250 to satisfy the configured maximum quantity of layers and/or ports for PUSCH transmissions that overlap with a PUCCH transmission. For this assumption, the PUSCH transmission 250 and the PUCCH transmission 260 are in the same CC (or same band or same frequency range), the PUSCH transmission 250 is associated with a first CORESET pool index value and the PUCCH transmission 260 is associated with a second, different CORESET pool index value, and the UE 115-*a* is configured not to multiplex PUCCH or UCI information onto an overlapping PUSCH (e.g., instead the UE 115-*a* is configured to transmit both the PUSCH and PUCCH separately and concurrently).

Reducing the quantity of PUSCH layers (or PUSCH antenna ports) may be useful for situations where both of the PUSCH transmission 250 and the PUCCH transmission 260 are semi-statically scheduled (not dynamically scheduled) (e.g., if the PUSCH transmission 250 is a DG-PUSCH and the PUCCH transmission 260 is a periodic or SP scheduling CSI report or scheduling request or a HARQ-ACK for a SP scheduled physical downlink data channel transmission). In such cases, both the PUSCH transmission 250 and the PUCCH transmission 260 are transmitted periodically (possibly with different periodicities), and it may not be possible for the network entity 105-*a* to ensure that the configured maximum PUSCH layers/antenna ports restrictions are not violated (e.g., unless the quantity of PUSCH layers and/or antenna ports are limited to the configured maximum regardless of whether the PUSCH overlaps with a PUCCH, which may result in performance degradation). In some examples, even when one or both of the PUSCH transmission 250 and the PUCCH transmission 260 are scheduled dynamically by a DCI, in order not to increase the DCI payload, a reduction in the quantity of layers and/or antenna ports by be determined by the UE 115-a based on the overlap (e.g., based on the scheduled resources) rather than being indicated by the DCI scheduling the PUSCH transmission 250.

In some examples, if the control message 220-a schedules a quantity of layers for the PUSCH transmission 250 that exceeds the indicated maximum quantity of layers (e.g., or if for codebook based PUSCH transmission, the control message 220-a indicates a quantity of antenna ports for the PUSCH transmission 250 that exceed the configured maximum quantity of antenna ports) the UE 115-a may drop either the PUSCH transmission 250 or the PUCCH transmission 260. In some cases, the UE 115-a may be configured to always drop the PUCCH transmission. In some cases, the UE 115-a may be configured to always drop the PUSCH transmission. In some examples, the PUCCH or PUSCH associated with a fixed CORESETPoolIndex value is dropped (e.g., the transmission associated with the second CORESETPoolIndex is dropped and the transmission associated with the first CORESETPoolIndex is transmitted). In some examples, the PUCCH transmission 260 or the PUSCH transmission 250 associated with a lower priority is dropped (e.g., PHY-layer priority associated with a channel). In some examples, the PUCCH transmission 260 or PUSCH transmission 250 is dropped based on the UCI type of the PUCCH transmission 260 (priority of the payload in the PUCCH) (e.g., if the PUCCH transmission 260 carries HARQ-Ack, the PUSCH transmission 250 is dropped; if the PUCCH transmission 260 carries a CSI report, the PUCCH transmission 260 is dropped). In some examples, if only one of the PUSCH transmission 250 or the PUCCH transmission 260 is scheduled by a DCI (e.g., is dynamically scheduled), the one that is semi-statically configured or activated (not scheduled by a DCI) is dropped (e.g., in case where the PUSCH transmission 250 is a DG-PUSCH and the PUCCH transmission 260 is a periodic or SP scheduled CSI report or scheduling request or HARQ-Ack for SP scheduled PDSCH, the PUCCH transmission 260 is dropped; or in case where the PUSCH transmission 250 is a CG-PUSCH and the PUCCH transmission 260 is a dynamic HARQ-Ack, the PUSCH transmission 250 is dropped). In some examples, the PUSCH transmission 250 or the PUCCH transmission 260 that starts later in time is dropped. In some examples, assumptions to trigger dropping one of the PUSCH transmission 250 or the PUCCH transmission 260 may include: the PUSCH transmission 250 and the PUCCH transmission 260 are in the same CC (or same band or same frequency range), the PUSCH transmission 250 is associated with a first CORESET pool index value and the PUCCH transmission 260 is associated with a different second CORESET pool index value, or the UE 115-a is configured not to multiplex PUCCH or UCI information onto an overlapping PUSCH (e.g., instead the UE 115-a is configured to transmit both the PUSCH and PUCCH separately and simultaneously).

In some examples, if the control message 220-a schedules a quantity of layers for the PUSCH transmission 250 that exceeds the indicated maximum quantity of layers (e.g., or if for codebook based PUSCH transmission, the control message 220-a indicates a quantity of antenna ports for the PUSCH transmission 250 that exceed the configured maximum quantity of antenna ports) the UE 115-a may multiplex the content of the PUCCH transmission 260 (e.g., UCI) onto the PUSCH transmission 250 and transmit only the PUSCH transmission 250 (and not transmit the PUCCH transmission 260). In some examples, this multiplexing procedure may be followed depending on the content of the PUCCH transmission 260 (e.g., UCI payload type). For example, the UE 115-a may only multiplex the content of the PUCCH transmission 260 onto the PUSCH transmission 250 in case of HARQ-Ack), and may follow a different course of action (e.g., dropping the PUCCH transmission) if the PUCCH content is a CSI report. In some examples, assumptions to trigger dropping one of the PUSCH transmission 250 or the PUCCH transmission 260 may include: the PUSCH transmission 250 and the PUCCH transmission 260 are in the same CC (or same band or same frequency range), the PUSCH transmission 250 is associated with a first CORESET pool index value, and the PUCCH transmission 260 is associated with a different second CORESET pool index value.

Figure 3:
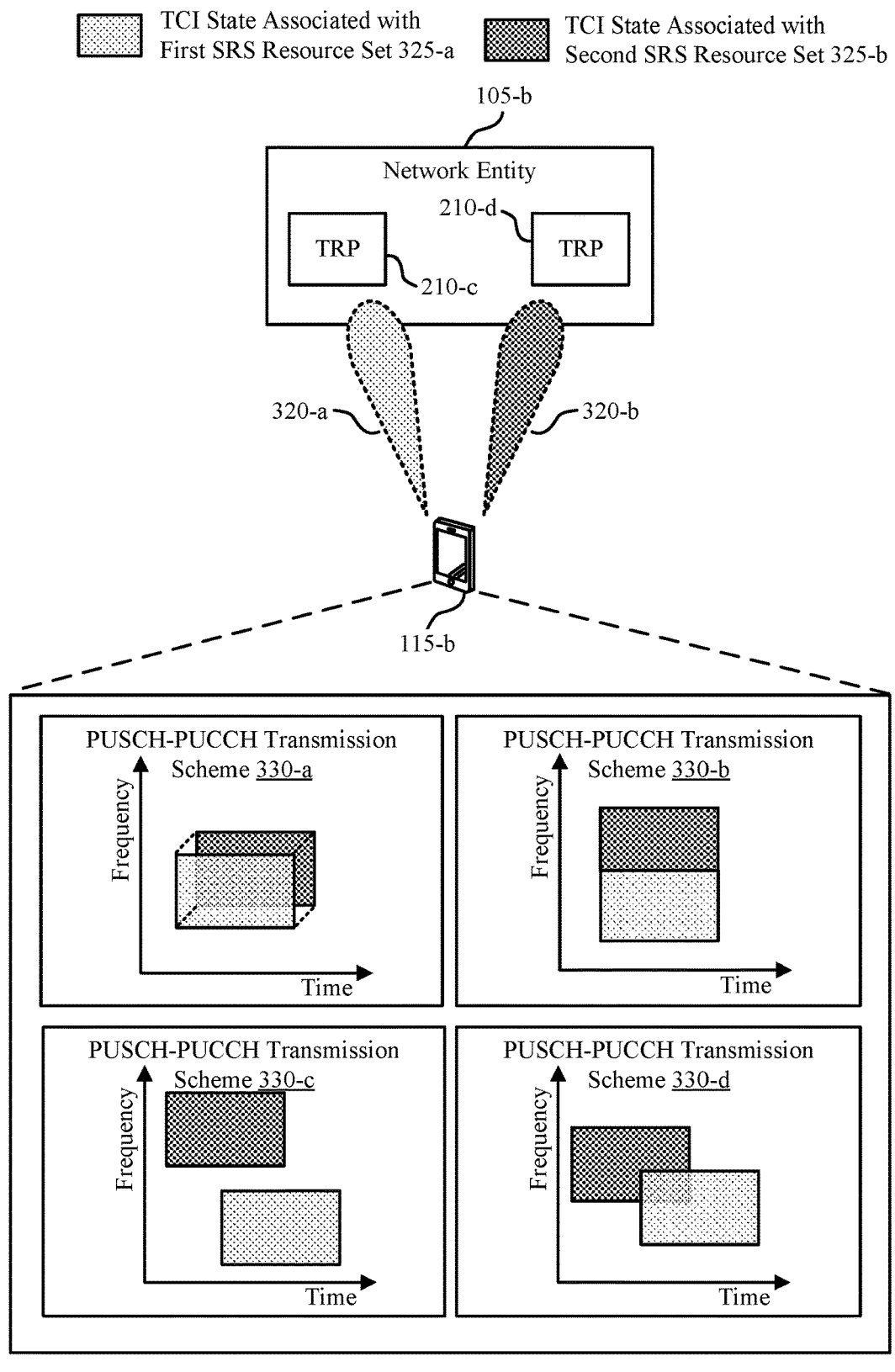
FIG. 3 illustrates an example of a multi-transmission and reception point (TRP) transmission scheme that supports overlapping PUCCH and PUSCH transmissions in accordance with one or more aspects of the present disclosure.

FIG. 3 illustrates an example of a multi-TRP transmission scheme 300 that supports overlapping PUCCH and PUSCH transmissions in accordance with one or more aspects of the present disclosure. The multi-TRP transmission scheme 300 may implement or be implemented to realize or facilitate aspects of the wireless communications system 100 or the wireless communications system 200. For example, the multi-TRP transmission scheme 300 includes a UE 115-b, which may be an example of a UE 115 as described herein. The multi-TRP transmission scheme 300 includes a network entity 105-b, which may be an example of a UE 115 as described herein. The multi-TRP transmission scheme 300 includes a TRP 210-c and a TRP 210-d, which may be examples of TRPs as described herein.

In some examples, the multi-TRP transmission scheme 300 may support PUSCH and PUCCH transmissions from a single UE 115-b to multiple TRPs (e.g., the TRP 210-c and the TRP 210-d) of the network entity 105-b via different directional beams (including beam 320-a and beam 320-b), where different beams may be associated with different SRS resource sets, different transmission configuration indicator (TCI) states, different layers, different PUSCH ports, or different panels of the UE 115-b, or any combination thereof. The multi-TRP transmission scheme 300 may illustrate an example of a PUSCH transmission and a PUCCH transmission overlapping at least partially in time. The multi-TRP transmission scheme 300 may illustrate examples of multiple PUSCH and PUCCH transmission schemes (e.g., PUSCH-PUCCH transmission scheme 330-a, PUSCH-PUCCH transmission scheme 330-b, PUSCH-PUCCH transmission scheme 330-c, and PUSCH-PUCCH transmission scheme 330-d). As depicted in the example of FIG. 3, the UE 115-b and the network entity 105-b may support multi-DCI based multi-TRP framework, where the PUSCH transmission and the PUCCH transmission are associated with different CoresetPoolIndex values. The PUSCH transmission (associated with CoresetPoolIndex value 0) may be associated with the first SRS resource set 325-a, and may be transmitted using a first beam or TCJ state or power control parameters or precoder. Similarly, the PUCCH transmission (associated with CoresetPoolIndex value 1) may be associated with the second SRS resource set 325-b, and may be transmitted using a second beam or TCJ state or power control parameters or precoder.

In some examples, the PUSCH transmission and the PUCCH transmission are in the same serving cell or CC and may partially or fully overlap in at least the time domain. The PUSCH transmission and the PUCCH transmission may overlap or may not overlap in the frequency domain. In the example of the PUSCH-PUCCH transmission scheme 330-a, the PUSCH transmission and the PUCCH transmission may overlap both in time and in frequency. In the example of the PUSCH-PUCCH transmission scheme 330-b, the PUSCH transmission and the PUCCH transmission overlap in time but not in frequency. In the example of the PUSCH-PUCCH transmission scheme 330-c, the PUSCH transmission and the PUCCH transmission partially overlap in time but do not overlap in frequency. In the example of the PUSCH-PUCCH transmission scheme 330-d, the PUSCH transmission and the PUCCH transmission partially overlap in time and frequency. The UE 115-b may interpret a control message in accordance with the techniques depicted herein and may transmit an uplink message using at least one of the PUSCH-PUCCH transmission scheme 330-a, the PUSCH-PUCCH transmission scheme 330-b, the PUSCH-PUCCH transmission scheme 330-c, and the PUSCH-PUCCH transmission scheme 330-d.

Figure 4:
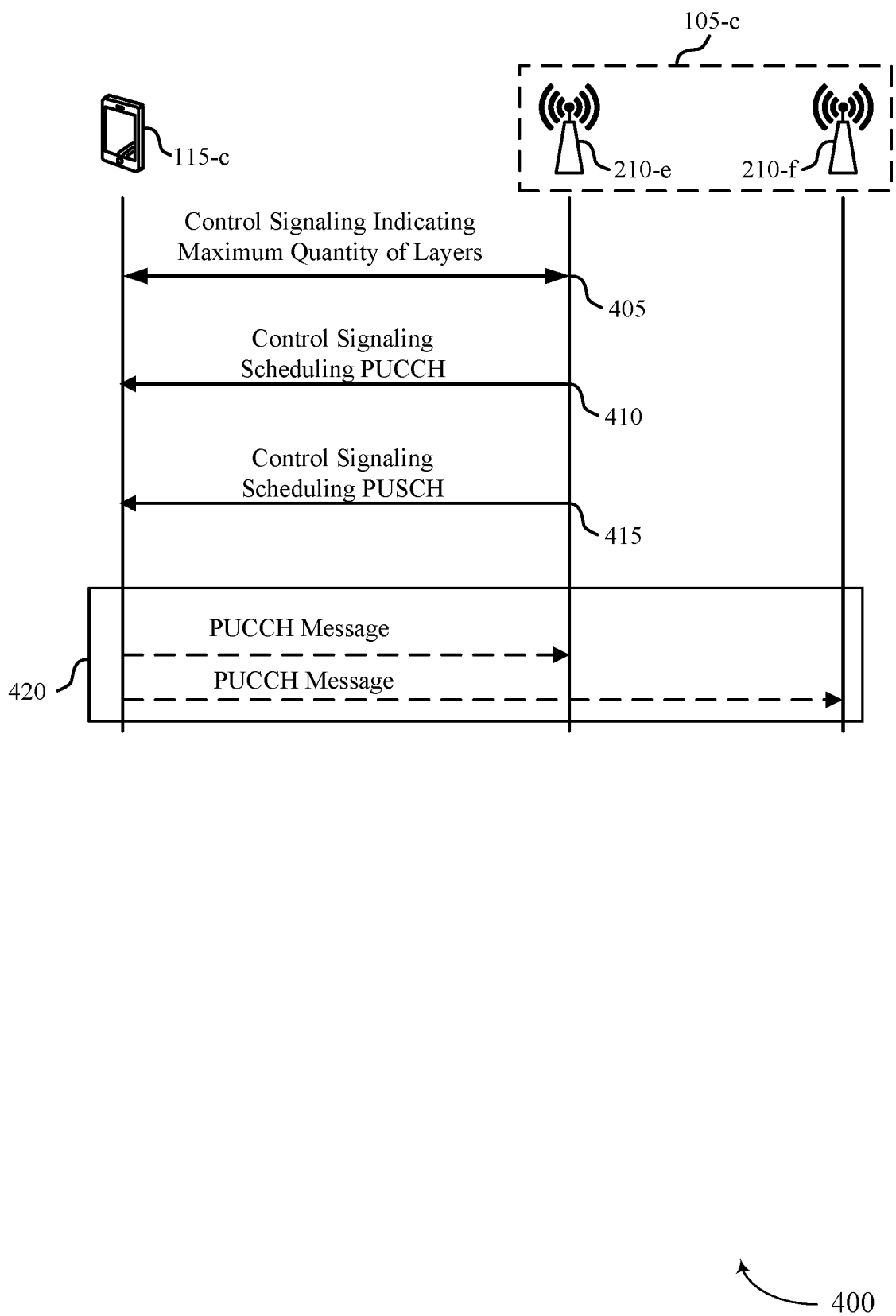
FIG. 4 illustrates an example of a process flow that supports overlapping PUCCH and PUSCH transmissions in accordance with one or more aspects of the present disclosure.

FIG. 4 illustrates an example of a process flow 400 that supports overlapping PUCCH and PUSCH transmissions in accordance with one or more aspects of the present disclosure. The process flow 400 may include a UE 115-c, which may be an example of a UE 115 as described herein. The process flow 400 may include a network entity 105-c, which may be an example of a network entity 105 as described herein. The process flow 400 includes a TRP 210-e and a TRP 210-f, which may be examples of TRPs as described herein. In the following description of the process flow 400, the operations between the network entity 105-c, the UE 115-c, the TRP 210-e, and the TRP 210-f may be transmitted in a different order than the example order shown, or the operations performed by the network entity 105-c, the ULE 115-c, the TRP 210-e, and the TRP 210-f may be performed in different orders or at different times. Some operations may also be omitted from the process flow 400, and other operations may be added to the process flow 400.

At 405, the UE 115-c and the network entity 105-c may communicate first control signaling indicating a maximum quantity of layers associated with uplink shared channel transmissions overlapping in the time domain with uplink control channel transmissions for the UE 115-c. In some examples, the network entity 105-c transmits the first control signaling (e.g., RRC signaling) to the UE 115-c. In some examples, the UE 115-c transmits an indication of a UE capability corresponding to the maximum quantity of layers. In some cases, the maximum quantity of layers may be a total quantity of layers for uplink control channel transmissions and uplink shared channel transmissions and the uplink control channel transmission is associated with one layer.

At 410, the UE 115-c, may receive from the network entity 105-c (via the TRP 210-e) control signaling scheduling an uplink control channel transmission associated with a first CORESET pool index. The first CORESET pool index may be associated with the TRP 210-e.

At 415, the UE 115-c may receive, from the network entity 105-c (via the TRP 210-f), third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission. The second CORESET pool index may be associated with the TRP 210-f.

At 420, the UE 115-c may transmit, and the network entity 105-c may receive (via the TRP 210-e and the TRP 210-f, respectively), at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

In some examples, communicating the first control signaling includes communicating an indication of a maximum quantity of ports associated with uplink shared channel transmissions overlapping in the time domain with uplink control channel transmissions for the UE, where the third control signaling indicates a quantity of antenna ports associated with the uplink shared channel transmission, and where transmitting at least one of the uplink control channel transmission or the uplink shared channel transmission is based on the maximum quantity of antenna ports and the quantity of antenna ports associated with the uplink shared channel transmission. In some examples, the uplink shared channel transmission is a codebook based uplink shared channel transmission.

In some examples, the UE 115-c may determine that the quantity of layers associated with the uplink shared channel transmission exceeds the maximum quantity of layers. The UE 115-c may select a subset of layers of the quantity of layers based on the determining that the quantity of layers associated with the uplink shared channel transmission exceeds the maximum quantity of layers, where a second quantity of layers corresponding to the subset of layers corresponds to the maximum quantity of layers. At 420, the UE 115-c may transmit the uplink control channel transmission and the uplink shared channel transmission via the subset of layers. In some examples, receiving the third control signaling at 415 includes receiving an indication of a set of SRS resources or a set of DMRS ports corresponding to the quantity of layers, and selecting the subset of layers includes selecting a subset of the set of SRS resources or a subset of the set of DMRS ports.

In some cases, the UE 115-c may determine that the quantity of layers associated with the uplink shared channel transmission exceeds the maximum quantity of layers, and transmitting at least one of the uplink control channel transmission or the uplink shared channel transmission includes transmitting one of the uplink control channel transmission or the uplink shared channel transmission and dropping one of the uplink control channel transmission or the uplink shared channel transmission based on the determining that the quantity of layers associated with the uplink shared channel transmission exceeds the maximum quantity of layers. In some cases, the UE 115-c may select to drop one of the uplink control channel transmission or the uplink shared channel transmission on the one being associated with a fixed CORESET pool index, the one having a lower priority, the one being the uplink control channel transmission and carrying a channel state information report, the one being the uplink shared channel transmission and the uplink control channel transmission carrying hybrid automatic repeat request feedback information, the one being scheduled for transmission later in time, or the one being scheduled for periodic or semi-static transmission.

In some cases, the UE 115-c may determine that the quantity of layers associated with the uplink shared channel transmission exceeds the maximum quantity of layers. The UE 115-*c* may multiplex information associated with the uplink control channel transmission onto the uplink shared channel transmission based on the determining that the quantity of layers associated with the uplink shared channel transmission exceeds the maximum quantity of layers, and transmitting at least one of the uplink control channel transmission or the uplink shared channel transmission includes transmitting the uplink shared channel transmission.

In some cases, the UE 115-*c* may determine, based on first communications resources associated with the uplink control channel transmission and second communications resources associated with the uplink shared channel transmission, that the uplink shared channel transmission at least partially overlaps in the time domain with the uplink control channel transmission. The second control signaling may indicate the first communications resources, the third control signaling may indicate the second communications resources, and transmitting at least one of the uplink control channel transmission or the uplink shared channel transmission may be based on the determining that the uplink shared channel transmission at least partially overlaps in the time domain with the uplink control channel transmission.

Figure 5:
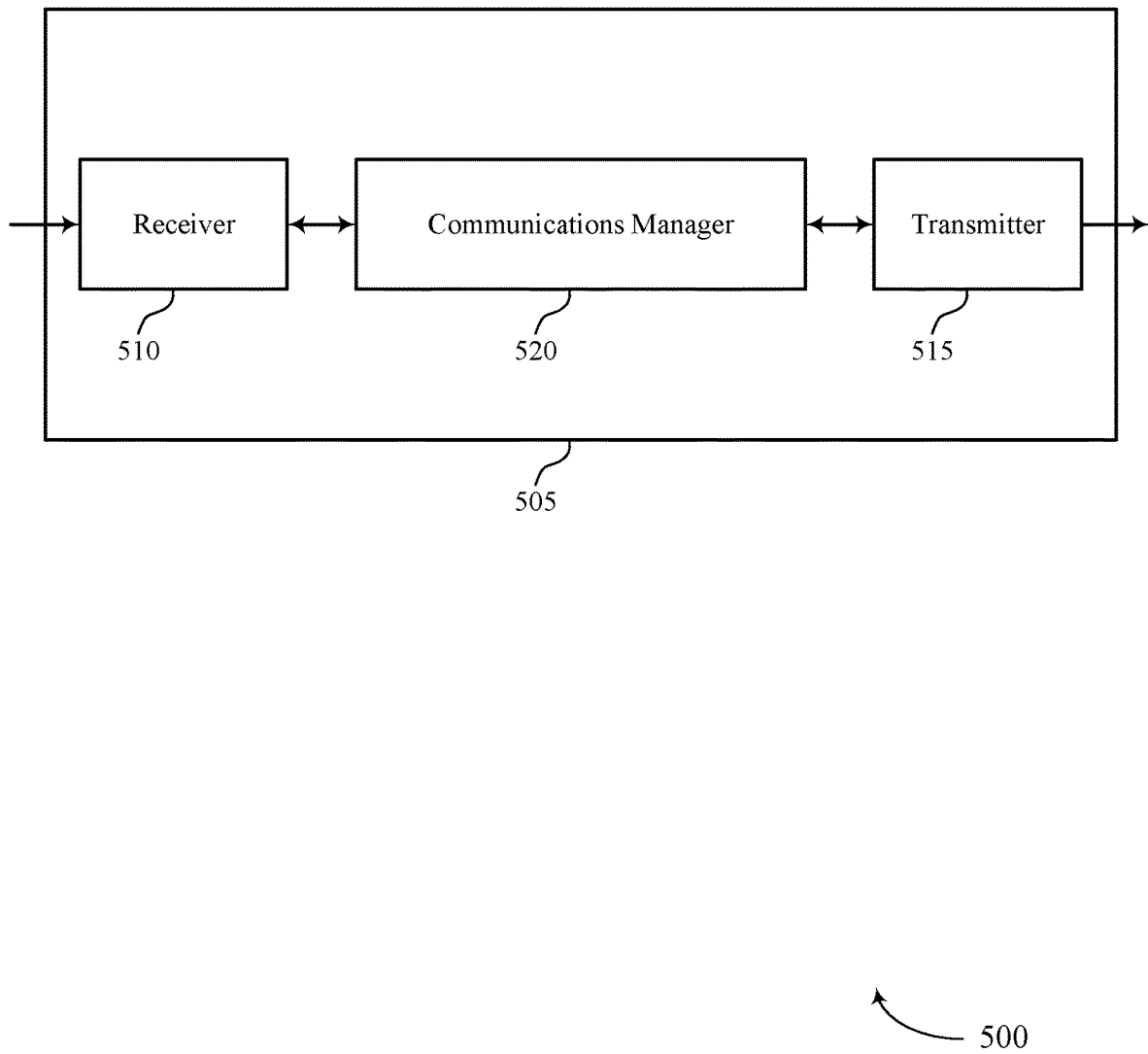
FIGS. 5 and 6 show block diagrams of devices that support overlapping PUCCH and PUSCH transmissions in accordance with one or more aspects of the present disclosure.

FIG. 5 shows a block diagram 500 of a device 505 that supports overlapping PUCCH and PUSCH transmissions in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to overlapping PUCCH and PUSCH transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to overlapping PUCCH and PUSCH transmissions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of overlapping PUCCH and PUSCH transmissions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

For example, the communications manager 520 may be configured as or otherwise support a means for communicating, with a network entity, first control signaling indicating a maximum quantity of layers associated with uplink shared channel transmissions overlapping in the time domain with uplink control channel transmissions for the UE. The communications manager 520 may be configured as or otherwise support a means for receiving, from the network entity, second control signaling scheduling an uplink control channel transmission associated with a first CORESET pool index. The communications manager 520 may be configured as or otherwise support a means for receiving, from the network entity, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission. The communications manager 520 may be configured as or otherwise support a means for transmitting at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources.

Figure 6:
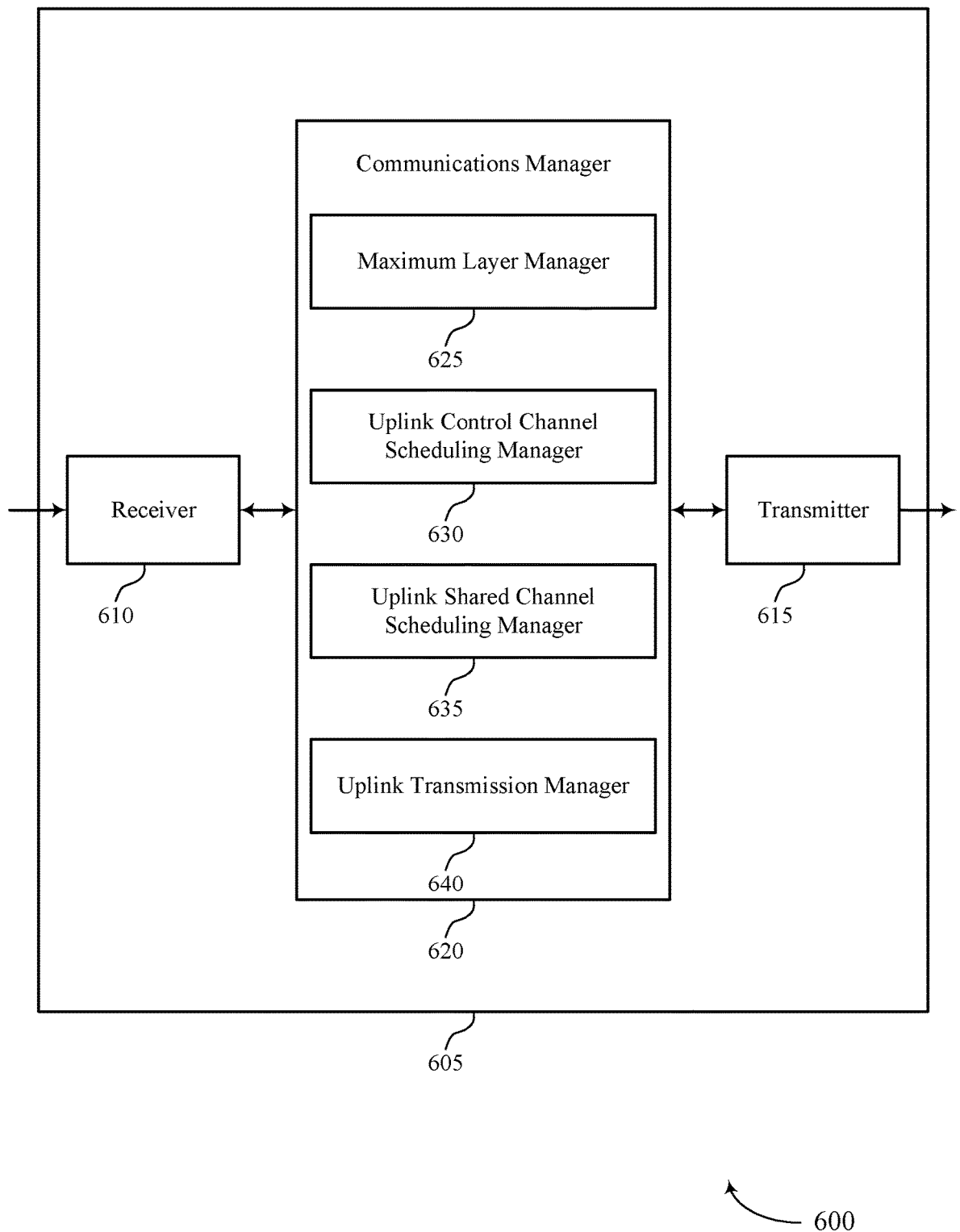

FIG. 6 shows a block diagram 600 of a device 605 that supports overlapping PUCCH and PUSCH transmissions in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to overlapping PUCCH and PUSCH transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to overlapping PUCCH and PUSCH transmissions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of overlapping PUCCH and PUSCH transmissions as described herein. For example, the communications manager 620 may include a maximum layer manager 625, an uplink control channel scheduling manager 630, an uplink shared channel scheduling manager 635, an uplink transmission manager 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The maximum layer manager 625 may be configured as or otherwise support a means for communicating, with a network entity, first control signaling indicating a maximum quantity of layers associated with uplink shared channel transmissions overlapping in the time domain with uplink control channel transmissions for the UE. The uplink control channel scheduling manager 630 may be configured as or otherwise support a means for receiving, from the network entity, second control signaling scheduling an uplink control channel transmission associated with a first CORESET pool index. The uplink shared channel scheduling manager 635 may be configured as or otherwise support a means for receiving, from the network entity, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission. The uplink transmission manager 640 may be configured as or otherwise support a means for transmitting at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

Figure 7:
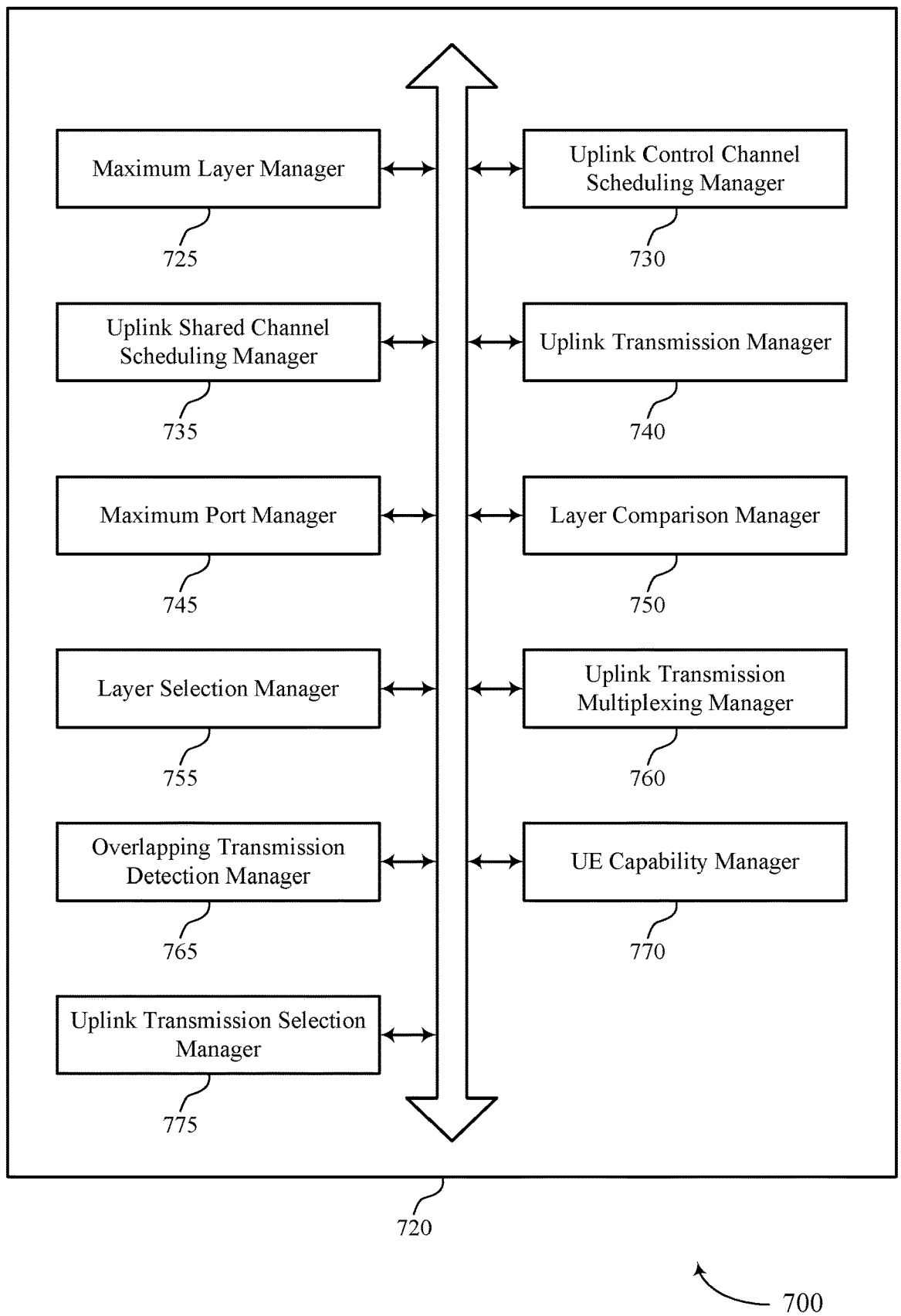
FIG. 7 shows a block diagram of a communications manager that supports overlapping PUCCH and PUSCH transmissions in accordance with one or more aspects of the present disclosure.

FIG. 7 shows a block diagram 700 of a communications manager 720 that supports overlapping PUCCH and PUSCH transmissions in accordance with one or more aspects of the present disclosure. The communications manager 720 may be an example of aspects of a communications manager 520, a communications manager 620, or both, as described herein. The communications manager 720, or various components thereof, may be an example of means for performing various aspects of overlapping PUCCH and PUSCH transmissions as described herein. For example, the communications manager 720 may include a maximum layer manager 725, an uplink control channel scheduling manager 730, an uplink shared channel scheduling manager 735, an uplink transmission manager 740, a maximum port manager 745, a layer comparison manager 750, a layer selection manager 755, an uplink transmission multiplexing manager 760, an overlapping transmission detection manager 765, a UE capability manager 770, an uplink transmission selection manager 775, or any combination thereof. Each of these components may communicate, directly or indirectly, with one another (e.g., via one or more buses).

The maximum layer manager 725 may be configured as or otherwise support a means for communicating, with a network entity, first control signaling indicating a maximum quantity of layers associated with uplink shared channel transmissions overlapping in the time domain with uplink control channel transmissions for the UE. The uplink control channel scheduling manager 730 may be configured as or otherwise support a means for receiving, from the network entity, second control signaling scheduling an uplink control channel transmission associated with a first CORESET pool index. The uplink shared channel scheduling manager 735 may be configured as or otherwise support a means for receiving, from the network entity, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission. The uplink transmission manager 740 may be configured as or otherwise support a means for transmitting at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

In some examples, to support communicating the first control signaling, the maximum port manager 745 may be configured as or otherwise support a means for communicating an indication of a maximum quantity of ports associated with uplink shared channel transmissions overlapping in the time domain with uplink control channel transmissions for the UE, where the third control signaling indicates a quantity of ports associated with the uplink shared channel transmission, and where transmitting at least one of the uplink control channel transmission or the uplink shared channel transmission is based on the maximum quantity of ports and the quantity of ports associated with the uplink shared channel transmission.

In some examples, the uplink shared channel transmission includes a codebook based uplink shared channel transmission.

In some examples, the layer comparison manager 750 may be configured as or otherwise support a means for determining that the quantity of layers associated with the uplink shared channel transmission exceeds the maximum quantity of layers. In some examples, the layer selection manager 755 may be configured as or otherwise support a means for selecting a subset of layers of the quantity of layers based on the determining, where a second quantity of layers corresponding to the subset of layers corresponds to the maximum quantity of layers. In some examples, the uplink transmission manager 740 may be configured as or otherwise support a means for transmitting the uplink control channel transmission and the uplink shared channel transmission via the subset of layers.

In some examples, to support receiving the third control signaling, the uplink shared channel scheduling manager 735 may be configured as or otherwise support a means for receiving an indication of a set of SRS resources or a set of DMRS ports corresponding to the quantity of layers, and where selecting the subset of layers includes selecting a subset of the set of SRS resources or a subset of the set of DMRS ports.

In some examples, the layer comparison manager 750 may be configured as or otherwise support a means for determining that the quantity of layers associated with the uplink shared channel transmission exceeds the maximum quantity of layers, where transmitting at least one of the uplink control channel transmission or the uplink shared channel transmission includes transmitting one of the uplink control channel transmission or the uplink shared channel transmission and dropping one of the uplink control channel transmission or the uplink shared channel transmission based on the determining.

In some examples, the uplink transmission selection manager 775 may be configured as or otherwise support a means for selecting to drop one of the uplink control channel transmission or the uplink shared channel transmission based on the one being associated with a fixed CORESET pool index, the one having a lower priority, the one being the uplink control channel transmission and carrying a channel state information report, the one being the uplink shared channel transmission and the uplink control channel transmission carrying hybrid automatic repeat request feedback information, the one being scheduled for transmission later in time, or the one being scheduled for periodic or semi-static transmission.

In some examples, the layer comparison manager 750 may be configured as or otherwise support a means for determining that the quantity of layers associated with the uplink shared channel transmission exceeds the maximum quantity of layers. In some examples, the uplink transmission multiplexing manager 760 may be configured as or otherwise support a means for multiplexing information associated with the uplink control channel transmission onto the uplink shared channel transmission based on the determining, where transmitting at least one of the uplink control channel transmission or the uplink shared channel transmission includes transmitting the uplink shared channel transmission.

In some examples, the overlapping transmission detection manager 765 may be configured as or otherwise support a means for determining, based on first communications resources associated with the uplink control channel transmission and second communications resources associated with the uplink shared channel transmission, that the uplink shared channel transmission at least partially overlaps in the time domain with the uplink control channel transmission, where the second control signaling indicates the first communications resources, where the third control signaling indicates the second communications resources, and where transmitting at least one of the uplink control channel transmission or the uplink shared channel transmission is based on the determining.

In some examples, to support receiving the third control signaling, the overlapping transmission detection manager 765 may be configured as or otherwise support a means for receiving an indication that the uplink shared channel transmission at least partially overlaps in the time domain with the uplink control channel transmission, where transmitting at least one of the uplink control channel transmission or the uplink shared channel transmission is based on the indication.

In some examples, to support communicating the first control signaling, the maximum layer manager 725 may be configured as or otherwise support a means for receiving the first control signaling from the network entity.

In some examples, to support communicating the first control signaling, the UE capability manager 770 may be configured as or otherwise support a means for transmitting an indication of a UE capability corresponding to the maximum quantity of layers.

In some examples, the maximum quantity of layers includes a total quantity of layers for uplink control channel transmissions and uplink shared channel transmissions. In some examples, the uplink control channel transmission is associated with one layer.

Figure 8:
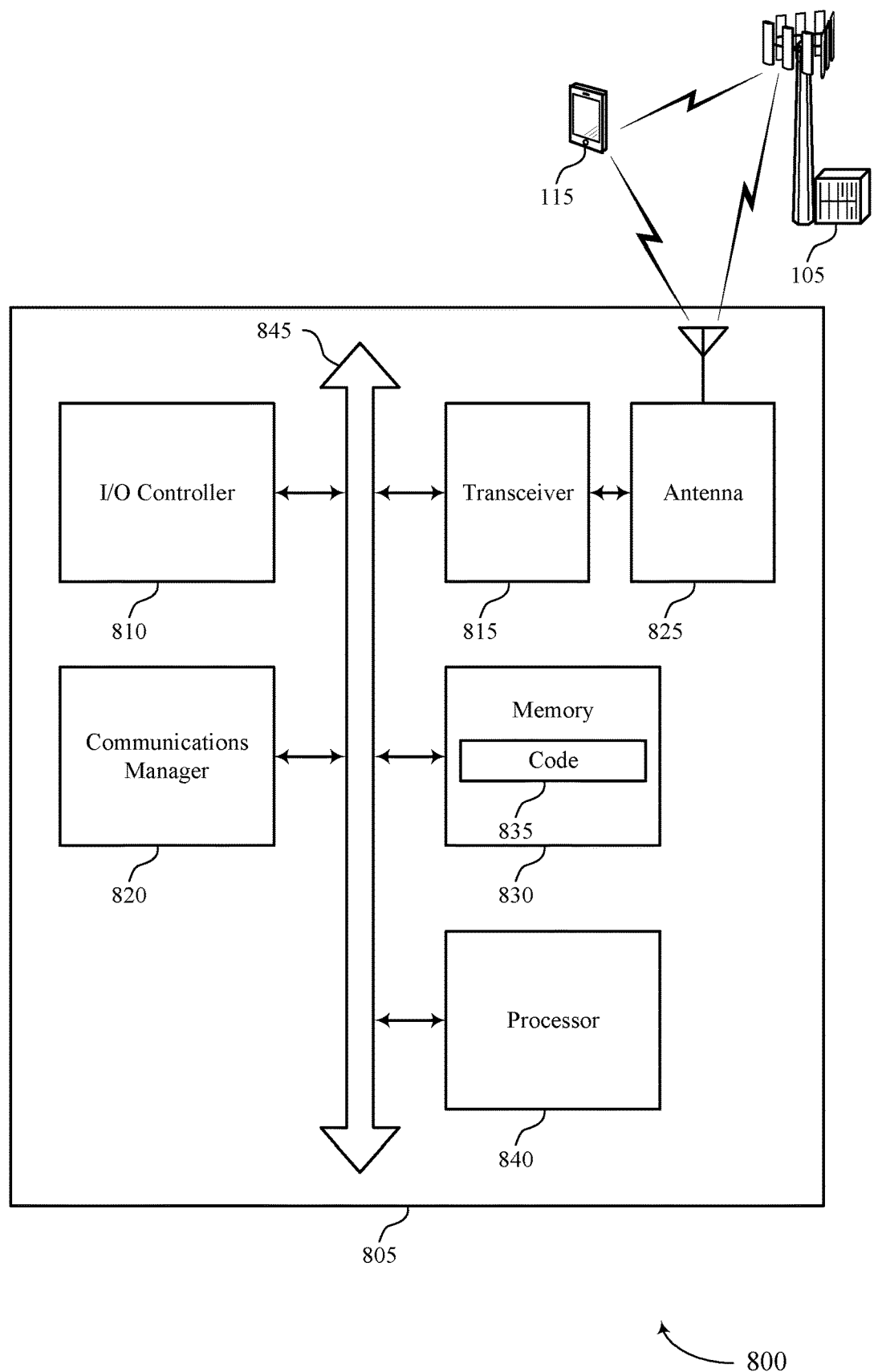
FIG. 8 shows a diagram of a system including a device that supports overlapping PUCCH and PUSCH transmissions in accordance with one or more aspects of the present disclosure.

FIG. 8 shows a diagram of a system 800 including a device 805 that supports overlapping PUCCH and PUSCH transmissions in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting overlapping PUCCH and PUSCH transmissions). For example, the device 805 or a component of the device 805 may include a processor 840 and memory 830 coupled with or to the processor 840, the processor 840 and memory 830 configured to perform various functions described herein.

For example, the communications manager 820 may be configured as or otherwise support a means for communicating, with a network entity, first control signaling indicating a maximum quantity of layers associated with uplink shared channel transmissions overlapping in the time domain with uplink control channel transmissions for the UE. The communications manager 820 may be configured as or otherwise support a means for receiving, from the network entity, second control signaling scheduling an uplink control channel transmission associated with a first CORESET pool index. The communications manager 820 may be configured as or otherwise support a means for receiving, from the network entity, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission. The communications manager 820 may be configured as or otherwise support a means for transmitting at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

By including or configuring the communications manager 820 in accordance with examples as described herein, the device 805 may support techniques for improved communication reliability, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of overlapping PUCCH and PUSCH transmissions as described herein, or the processor 840 and the memory 830 may be otherwise configured to perform or support such operations.

Figure 9:
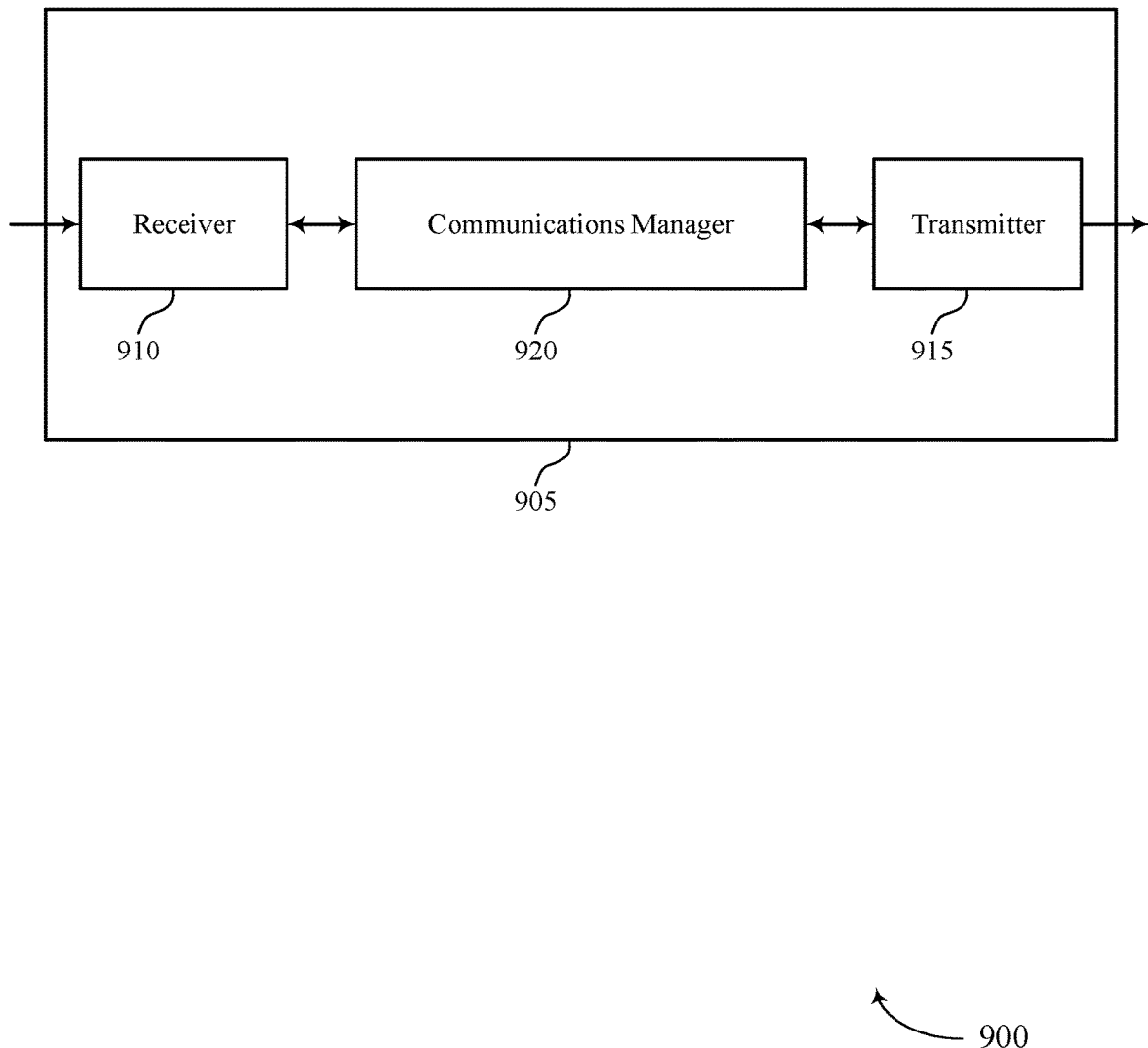
FIGS. 9 and 10 show block diagrams of devices that support overlapping PUCCH and PUSCH transmissions in accordance with one or more aspects of the present disclosure.

FIG. 9 shows a block diagram 900 of a device 905 that supports overlapping PUCCH and PUSCH transmissions in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of overlapping PUCCH and PUSCH transmissions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for communicating, with a UE, first control signaling indicating a maximum quantity of layers associated with uplink shared channel transmissions overlapping in the time domain with uplink control channel transmissions for the UE. The communications manager 920 may be configured as or otherwise support a means for transmitting, to the UE, second control signaling scheduling an uplink control channel transmission associated with a first CORESET pool index. The communications manager 920 may be configured as or otherwise support a means for transmitting, to the UE, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission. The communications manager 920 may be configured as or otherwise support a means for receiving, from the UE, at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources.

Figure 10:
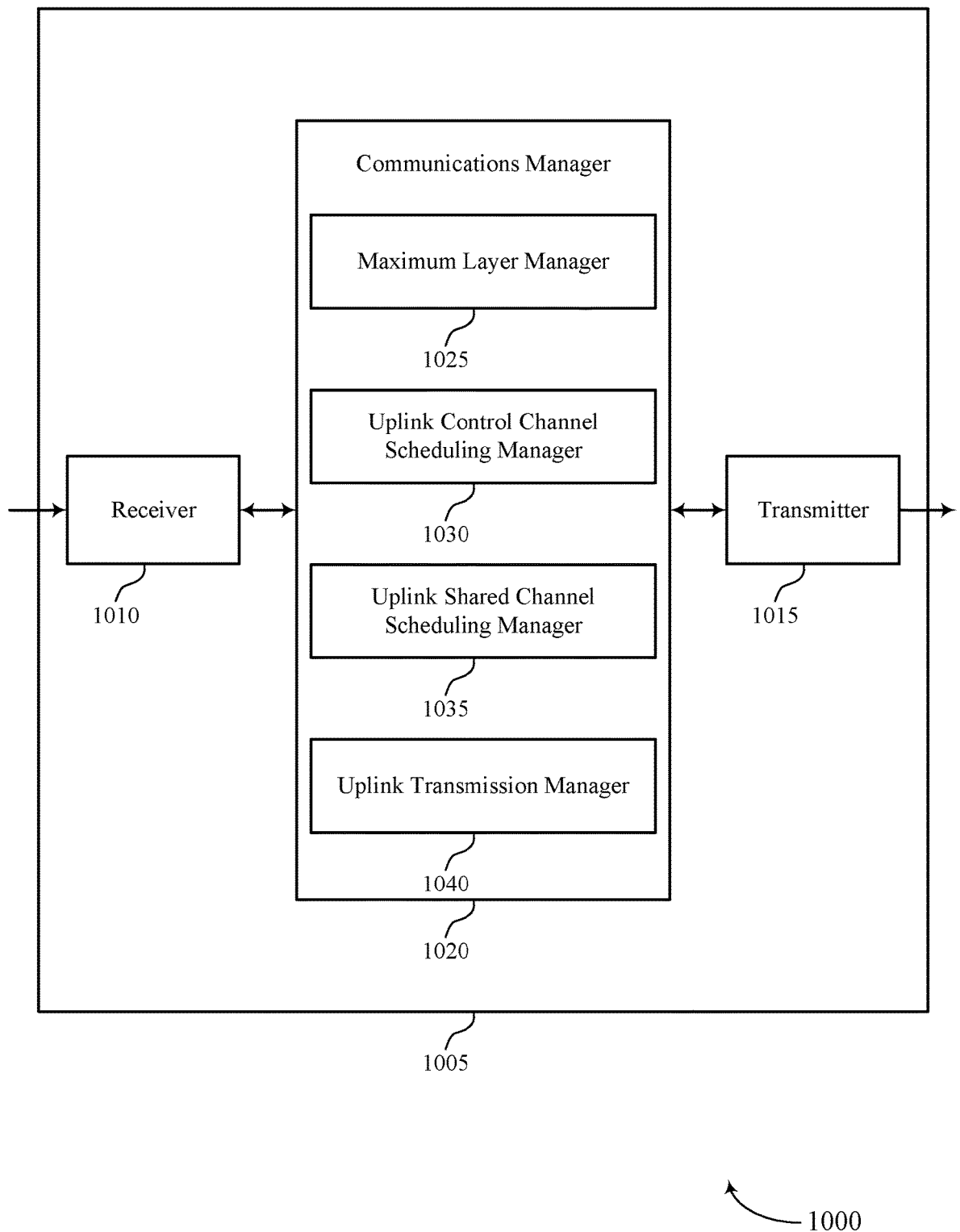

FIG. 10 shows a block diagram 1000 of a device 1005 that supports overlapping PUCCH and PUSCH transmissions in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of overlapping PUCCH and PUSCH transmissions as described herein. For example, the communications manager 1020 may include a maximum layer manager 1025, an uplink control channel scheduling manager 1030, an uplink shared channel scheduling manager 1035, an uplink transmission manager 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The maximum layer manager 1025 may be configured as or otherwise support a means for communicating, with a UE, first control signaling indicating a maximum quantity of layers associated with uplink shared channel transmissions overlapping in the time domain with uplink control channel transmissions for the UE. The uplink control channel scheduling manager 1030 may be configured as or otherwise support a means for transmitting, to the UE, second control signaling scheduling an uplink control channel transmission associated with a first CORESET pool index. The uplink shared channel scheduling manager 1035 may be configured as or otherwise support a means for transmitting, to the UE, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission. The uplink transmission manager 1040 may be configured as or otherwise support a means for receiving, from the UE, at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

Figure 11:
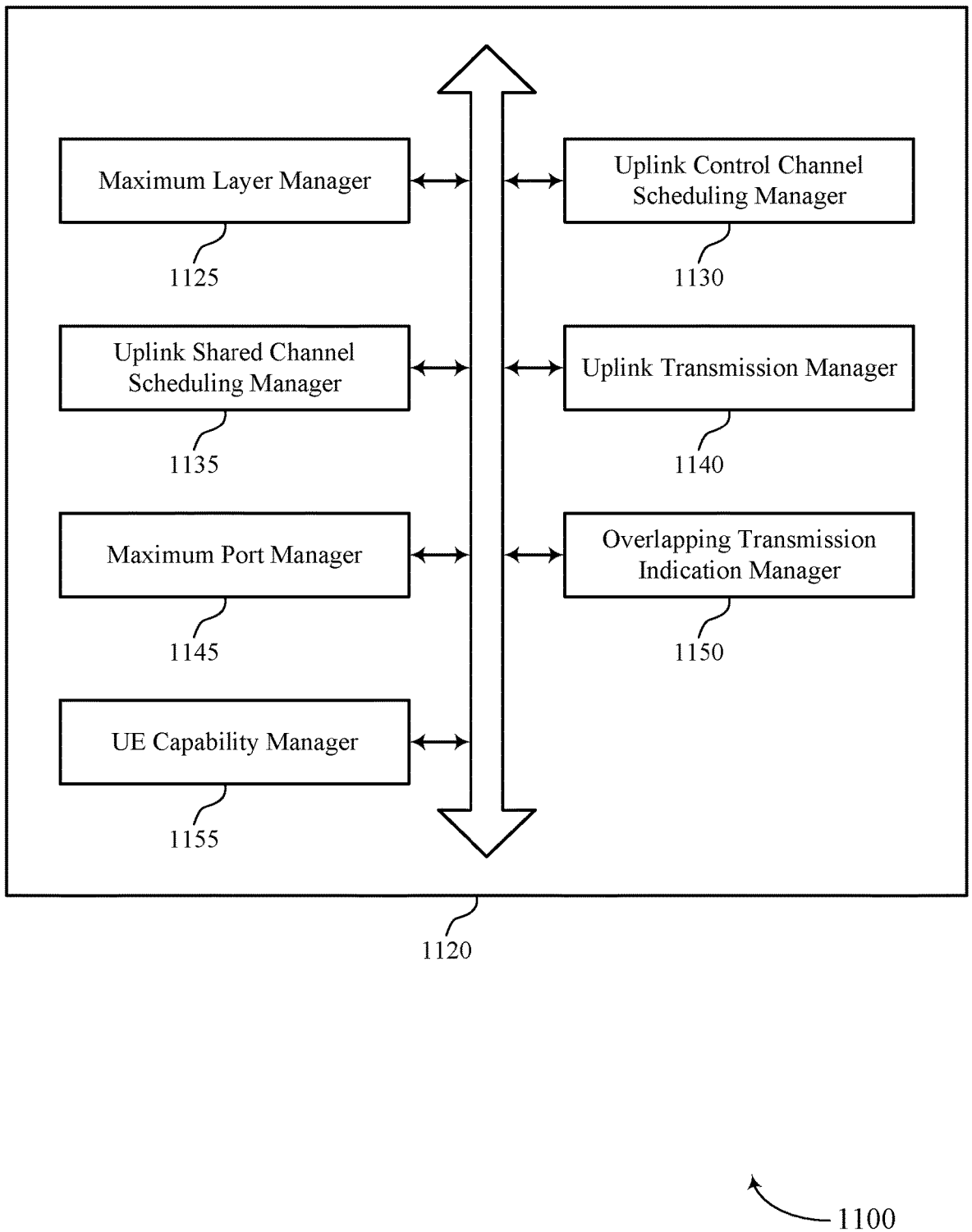
FIG. 11 shows a block diagram of a communications manager that supports overlapping PUCCH and PUSCH transmissions in accordance with one or more aspects of the present disclosure.

FIG. 11 shows a block diagram 1100 of a communications manager 1120 that supports overlapping PUCCH and PUSCH transmissions in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of overlapping PUCCH and PUSCH transmissions as described herein. For example, the communications manager 1120 may include a maximum layer manager 1125, an uplink control channel scheduling manager 1130, an uplink shared channel scheduling manager 1135, an uplink transmission manager 1140, a maximum port manager 1145, an overlapping transmission indication manager 1150, a UE capability manager 1155, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The maximum layer manager 1125 may be configured as or otherwise support a means for communicating, with a UE, first control signaling indicating a maximum quantity of layers associated with uplink shared channel transmissions overlapping in the time domain with uplink control channel transmissions for the UE. The uplink control channel scheduling manager 1130 may be configured as or otherwise support a means for transmitting, to the UE, second control signaling scheduling an uplink control channel transmission associated with a first CORESET pool index. The uplink shared channel scheduling manager 1135 may be configured as or otherwise support a means for transmitting, to the UE, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission. The uplink transmission manager 1140 may be configured as or otherwise support a means for receiving, from the UE, at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

In some examples, to support communicating the first control signaling, the maximum port manager 1145 may be configured as or otherwise support a means for communicating an indication of a maximum quantity of ports associated with uplink shared channel transmissions overlapping in the time domain with uplink control channel transmissions for the UE, where the third control signaling indicates a quantity of ports associated with the uplink shared channel transmission, and where receiving at least one of the uplink control channel transmission or the uplink shared channel transmission is based on the maximum quantity of ports and the quantity of ports associated with the uplink shared channel transmission.

In some examples, the uplink shared channel transmission includes a codebook based uplink shared channel transmission.

In some examples, the uplink transmission manager 1140 may be configured as or otherwise support a means for receiving the uplink control channel transmission and the uplink shared channel transmission via a subset of layers of the quantity of layers, where the quantity of layers associated with the uplink shared channel transmission exceeds the maximum quantity of layers, and where a second quantity of layers corresponding to the subset of layers corresponds to the maximum quantity of layers.

In some examples, to support transmitting the third control signaling, the uplink shared channel scheduling manager 1135 may be configured as or otherwise support a means for transmitting an indication of a set of SRS resources or a set of DMRS ports corresponding to the quantity of layers.

In some examples, to support receiving at least one of the uplink control channel transmission or the uplink shared channel transmission, the uplink transmission manager 1140 may be configured as or otherwise support a means for receiving one of the uplink control channel transmission or the uplink shared channel transmission, where the quantity of layers associated with the uplink shared channel transmission exceeds the maximum quantity of layers.

In some examples, to support receiving at least one of the uplink control channel transmission or the uplink shared channel transmission, the uplink transmission manager 1140 may be configured as or otherwise support a means for receiving the uplink shared channel transmission with information associated with the uplink control channel transmission multiplexed onto the uplink shared channel transmission, where the quantity of layers associated with the uplink shared channel transmission exceeds the maximum quantity of layers.

In some examples, to support transmitting the third control signaling, the overlapping transmission indication manager 1150 may be configured as or otherwise support a means for transmitting an indication that the uplink shared channel transmission at least partially overlaps in the time domain with the uplink control channel transmission, where transmitting at least one of the uplink control channel transmission or the uplink shared channel transmission is based on the indication.

In some examples, to support communicating the first control signaling, the maximum layer manager 1125 may be configured as or otherwise support a means for transmitting the first control signaling.

In some examples, to support communicating the first control signaling, the UE capability manager 1155 may be configured as or otherwise support a means for receiving an indication of a UE capability corresponding to the maximum quantity of layers.

In some examples, the maximum quantity of layers includes a total quantity of layers for uplink control channel transmissions and uplink shared channel transmissions. In some examples, the uplink control channel transmission is associated with one layer.

Figure 12:
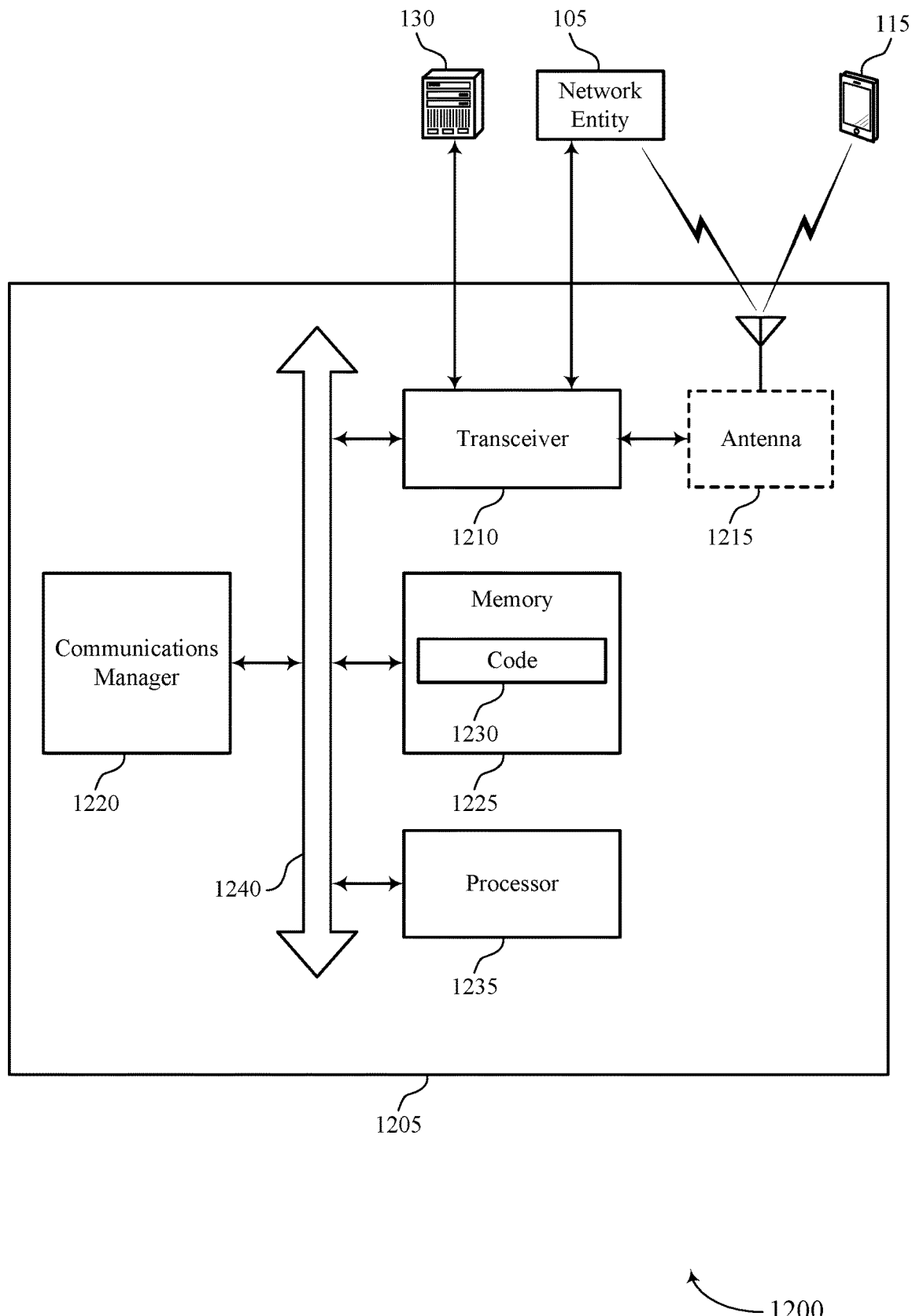
FIG. 12 shows a diagram of a system including a device that supports overlapping PUCCH and PUSCH transmissions in accordance with one or more aspects of the present disclosure.

FIG. 12 shows a diagram of a system 1200 including a device 1205 that supports overlapping PUCCH and PUSCH transmissions in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting overlapping PUCCH and PUSCH transmissions). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for communicating, with a UE, first control signaling indicating a maximum quantity of layers associated with uplink shared channel transmissions overlapping in the time domain with uplink control channel transmissions for the UE. The communications manager 1220 may be configured as or otherwise support a means for transmitting, to the UE, second control signaling scheduling an uplink control channel transmission associated with a first CORESET pool index. The communications manager 1220 may be configured as or otherwise support a means for transmitting, to the UE, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission. The communications manager 1220 may be configured as or otherwise support a means for receiving, from the UE, at least one of the uplink control channel transmission in accordance with the first CORESET pool index or the uplink shared channel transmission in accordance with the second CORESET pool index based on the maximum quantity of layers and the quantity of layers associated with the uplink shared channel transmission.

By including or configuring the communications manager 1220 in accordance with examples as described herein, the device 1205 may support techniques for improved communication reliability, more efficient utilization of communication resources, and improved coordination between devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of overlapping PUCCH and PUSCH transmissions as described herein, or the processor 1235 and the memory 1225 may be otherwise configured to perform or support such operations.

Figure 13:
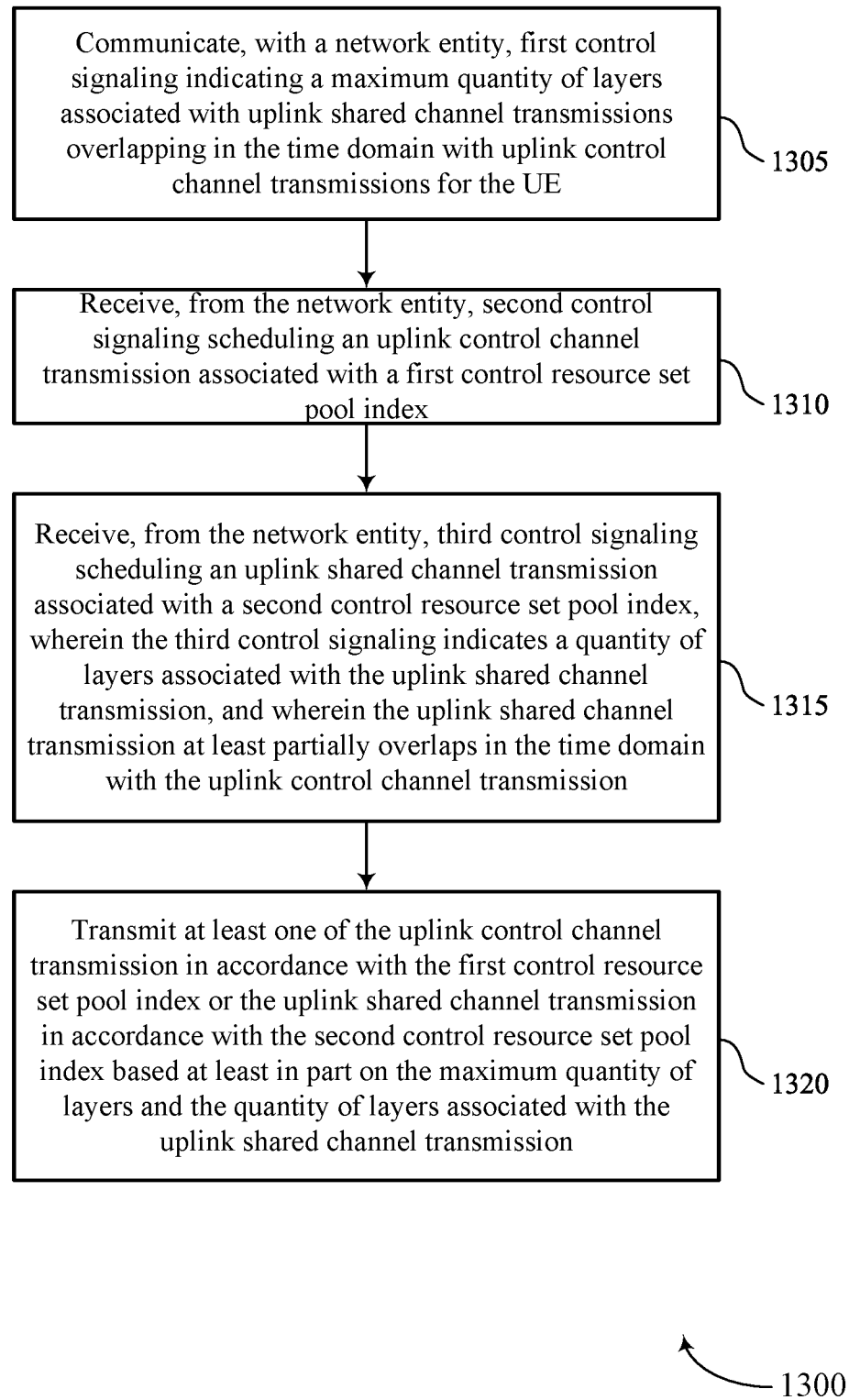
FIGS. 13 through 16 show flowcharts illustrating methods that support overlapping PUCCH and PUSCH transmissions in accordance with one or more aspects of the present disclosure.

FIG. 13 shows a flowchart illustrating a method 1300 that supports overlapping PUCCH and PUSCH transmissions in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include communicating, with a network entity, first control signaling indicating a maximum quantity of layers associated with uplink shared channel transmissions overlapping in the time domain with uplink control channel transmissions for the UE. The operations of 1305 may be performed in accordance with examples as disclosed herein. In some examples, aspects of the operations of 1305 may be performed by a maximum layer manager 725 as described with reference to FIG. 7.

At 1310, the method may include receiving, from the network entity, second control signaling scheduling an uplink control channel transmission associated with a first CORESET pool index. The operations of 1310 may be performed in accordance with examples as disclosed herein. In some examples, aspects of the operations of 1310 may be performed by an uplink control channel scheduling manager 730 as described with reference to FIG. 7.

At 1315, the method may include receiving, from the network entity, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission. The operations of 1315 may be performed in accordance with examples as disclosed herein. In some examples, aspects of the operations of 1315 may be performed by an uplink shared channel scheduling manager 735 as described with reference to FIG. 7.

At 1320, the method may include transmitting at least one of the uplink control channel transmission in accordance with the first CORESET pool index or the uplink shared channel transmission in accordance with the second CORESET pool index based on the maximum quantity of layers and the quantity of layers associated with the uplink shared channel transmission. The operations of 1320 may be performed in accordance with examples as disclosed herein. In some examples, aspects of the operations of 1320 may be performed by an uplink transmission manager 740 as described with reference to FIG. 7.

Figure 14:
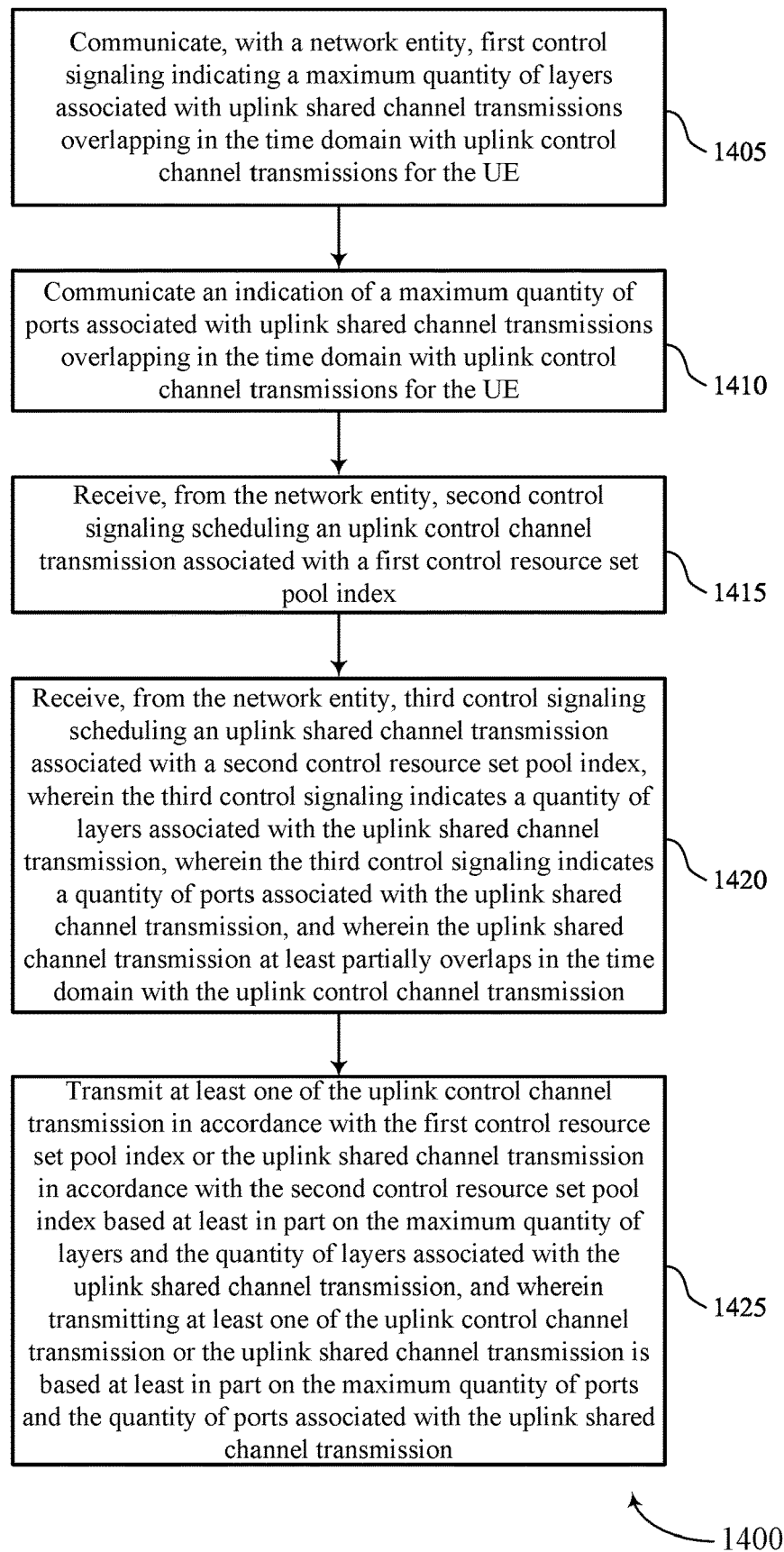

FIG. 14 shows a flowchart illustrating a method 1400 that supports overlapping PUCCH and PUSCH transmissions in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include communicating, with a network entity, first control signaling indicating a maximum quantity of layers associated with uplink shared channel transmissions overlapping in the time domain with uplink control channel transmissions for the UE. The operations of 1405 may be performed in accordance with examples as disclosed herein. In some examples, aspects of the operations of 1405 may be performed by a maximum layer manager 725 as described with reference to FIG. 7.

At 1410, the method may include communicating an indication of a maximum quantity of ports associated with uplink shared channel transmissions overlapping in the time domain with uplink control channel transmissions for the UE. The operations of 1410 may be performed in accordance with examples as disclosed herein. In some examples, aspects of the operations of 1410 may be performed by a maximum port manager 745 as described with reference to FIG. 7.

At 1415, the method may include receiving, from the network entity, second control signaling scheduling an uplink control channel transmission associated with a first CORESET pool index. The operations of 1415 may be performed in accordance with examples as disclosed herein. In some examples, aspects of the operations of 1415 may be performed by an uplink control channel scheduling manager 730 as described with reference to FIG. 7.

At 1420, the method may include receiving, from the network entity, third control signaling scheduling an uplink shared channel transmission associated with a second CORESET pool index, where the third control signaling indicates a quantity of layers associated with the uplink shared channel transmission, where the third control signaling indicates a quantity of ports associated with the uplink shared channel transmission, and where the uplink shared channel transmission at least partially overlaps in the time domain with the uplink control channel transmission. The operations of 1420 may be performed in accordance with examples as disclosed herein. In some examples, aspects of the operations of 1420 may be performed by an uplink shared channel scheduling manager 735 as described with reference to FIG. 7.

At 1425, the method may include transmitting at least one of the uplink control channel transmission in accordance with the first CORESET pool index or the uplink shared channel transmission in accordance with the second CORESET pool index based on the maximum quantity of layers and the quantity of layers associated with the uplink shared channel transmission, and where transmitting at least one of the uplink control channel transmission or the uplink shared channel transmission is based on the maximum quantity of ports and the quantity of ports associated with the uplink shared channel transmission. The operations of 1425 may be performed in accordance with examples as disclosed herein. In some examples, aspects of the operations of 1425 may be performed by an uplink transmission manager 740 as described with reference to FIG. 7.

Figure 15:
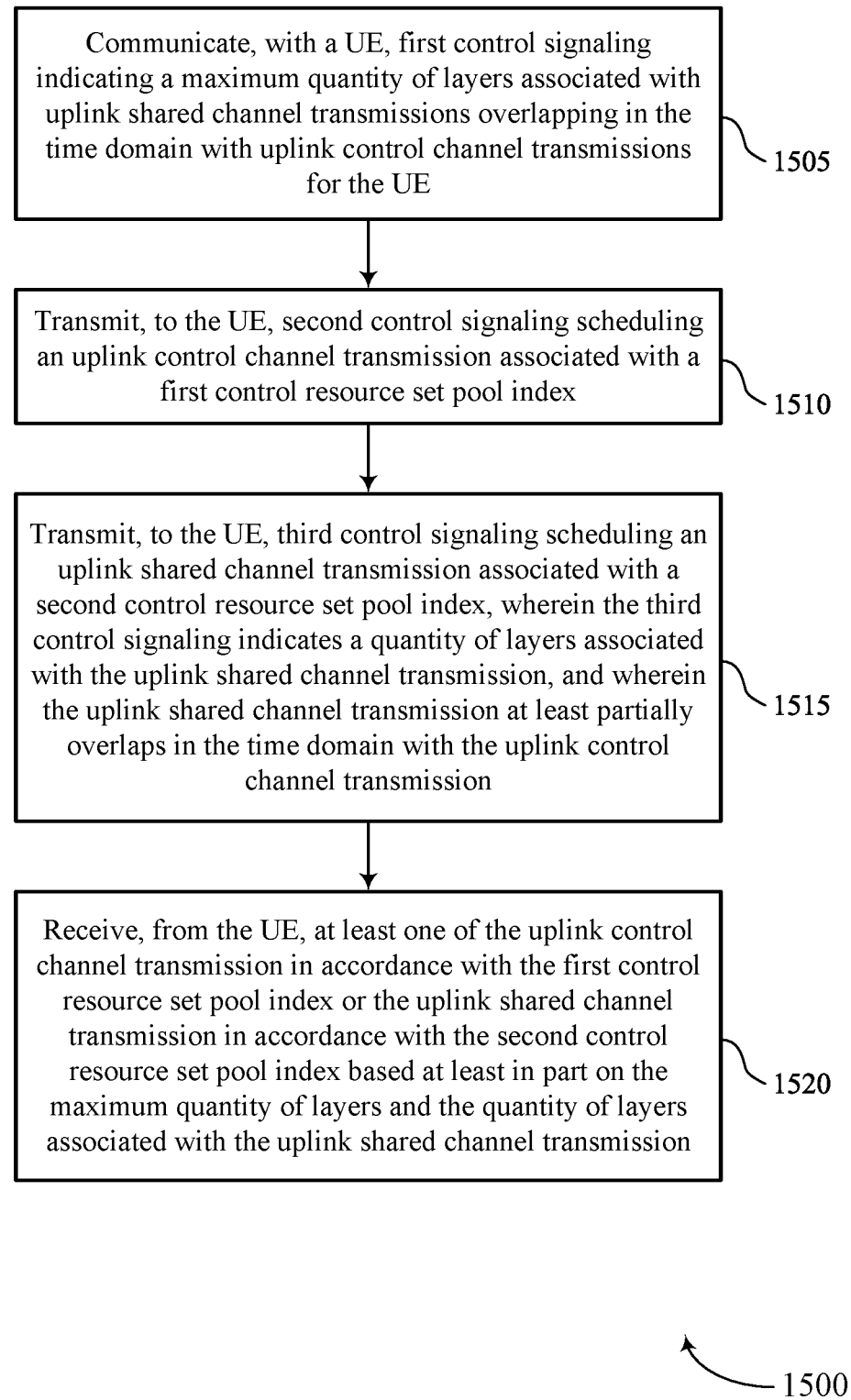

FIG. 15 shows a flowchart illustrating a method 1500 that supports overlapping PUCCH and PUSCH transmissions in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include communicating, with a UE, first control signaling indicating a maximum quantity of layers associated with uplink shared channel transmissions overlapping in the time domain with uplink control channel transmissions for the UE. The operations of 1505 may be performed in accordance with examples as disclosed herein. In some examples, aspects of the operations of 1505 may be performed by a maximum layer manager 1125 as described with reference to FIG. 11.

At 1510, the method may include transmitting, to the UE, second control signaling scheduling an uplink control channel transmission associated with a first CORESET pool index. The operations of 1510 may be performed in accordance with examples as disclosed herein. In some examples, aspects of the operations of 1510 may be performed by an uplink control channel scheduling manager 1130 as described with reference to FIG. 11.

At 1515, the method may include transmitting, to the UE, third control signaling scheduling an uplink shared channel transmission associated with a second CORESET pool index, where the third control signaling indicates a quantity of layers associated with the uplink shared channel transmission, and where the uplink shared channel transmission at least partially overlaps in the time domain with the uplink control channel transmission. The operations of 1515 may be performed in accordance with examples as disclosed herein. In some examples, aspects of the operations of 1515 may be performed by an uplink shared channel scheduling manager 1135 as described with reference to FIG. 11.

At 1520, the method may include receiving, from the UE, at least one of the uplink control channel transmission in accordance with the first CORESET pool index or the uplink shared channel transmission in accordance with the second CORESET pool index based on the maximum quantity of layers and the quantity of layers associated with the uplink shared channel transmission. The operations of 1520 may be performed in accordance with examples as disclosed herein. In some examples, aspects of the operations of 1520 may be performed by an uplink transmission manager 1140 as described with reference to FIG. 11.

Figure 16:
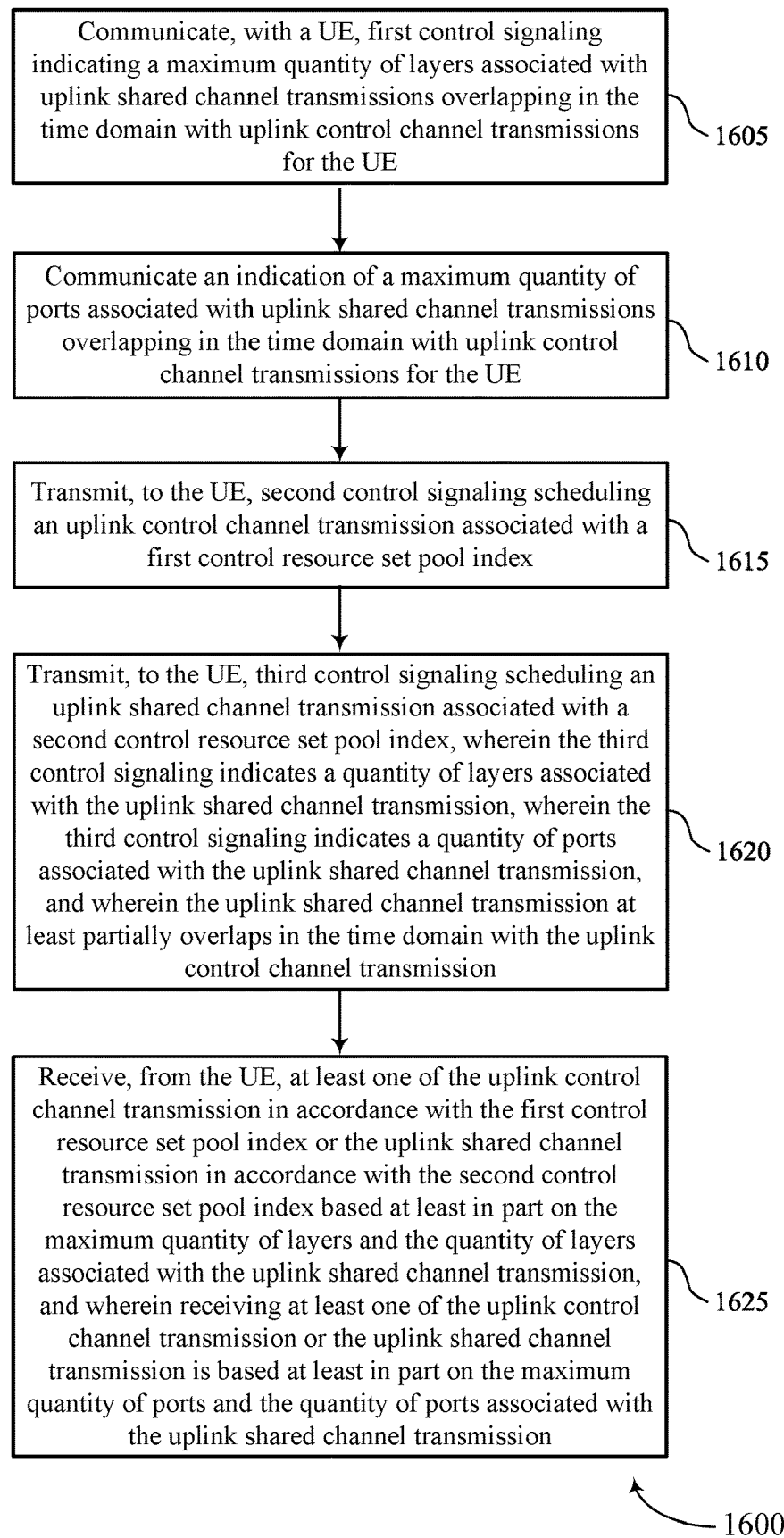

FIG. 16 shows a flowchart illustrating a method 1600 that supports overlapping PUCCH and PUSCH transmissions in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include communicating, with a UE, first control signaling indicating a maximum quantity of layers associated with uplink shared channel transmissions overlapping in the time domain with uplink control channel transmissions for the UE. The operations of 1605 may be performed in accordance with examples as disclosed herein. In some examples, aspects of the operations of 1605 may be performed by a maximum layer manager 1125 as described with reference to FIG. 11.

At 1610, the method may include communicating an indication of a maximum quantity of ports associated with uplink shared channel transmissions overlapping in the time domain with uplink control channel transmissions for the UE. The operations of 1610 may be performed in accordance with examples as disclosed herein. In some examples, aspects of the operations of 1610 may be performed by a maximum port manager 1145 as described with reference to FIG. 11.

At 1615, the method may include transmitting, to the UE, second control signaling scheduling an uplink control channel transmission associated with a first CORESET pool index. The operations of 1615 may be performed in accordance with examples as disclosed herein. In some examples, aspects of the operations of 1615 may be performed by an uplink control channel scheduling manager 1130 as described with reference to FIG. 11.

At 1620, the method may include transmitting, to the UE, third control signaling scheduling an uplink shared channel transmission associated with a second CORESET pool index, where the third control signaling indicates a quantity of layers associated with the uplink shared channel transmission, where the third control signaling indicates a quantity of ports associated with the uplink shared channel transmission, and where the uplink shared channel transmission at least partially overlaps in the time domain with the uplink control channel transmission. The operations of 1620 may be performed in accordance with examples as disclosed herein. In some examples, aspects of the operations of 1620 may be performed by an uplink shared channel scheduling manager 1135 as described with reference to FIG. 11.

At 1625, the method may include receiving, from the UE, at least one of the uplink control channel transmission in accordance with the first CORESET pool index or the uplink shared channel transmission in accordance with the second CORESET pool index based on the maximum quantity of layers and the quantity of layers associated with the uplink shared channel transmission, and where receiving at least one of the uplink control channel transmission or the uplink shared channel transmission is based on the maximum quantity of ports and the quantity of ports associated with the uplink shared channel transmission. The operations of 1625 may be performed in accordance with examples as disclosed herein. In some examples, aspects of the operations of 1625 may be performed by an uplink transmission manager 1140 as described with reference to FIG. 11.

The following provides an overview of aspects of the present disclosure:

Aspect 1: A method of wireless communications at a UE, comprising: communicating, with a network entity, first control signaling indicating a maximum quantity of layers associated with uplink shared channel transmissions overlapping in the time domain with uplink control channel transmissions for the UE; receiving, from the network entity, second control signaling scheduling an uplink control channel transmission associated with a first CORESET pool index; receiving, from the network entity, third control signaling scheduling an uplink shared channel transmission associated with a second CORESET pool index, wherein the third control signaling indicates a quantity of layers associated with the uplink shared channel transmission, and wherein the uplink shared channel transmission at least partially overlaps in the time domain with the uplink control channel transmission; and transmitting at least one of the uplink control channel transmission in accordance with the first CORESET pool index or the uplink shared channel transmission in accordance with the second CORESET pool index based at least in part on the maximum quantity of layers and the quantity of layers associated with the uplink shared channel transmission.

Aspect 2: The method of aspect 1, wherein communicating the first control signaling comprises: communicating an indication of a maximum quantity of ports associated with uplink shared channel transmissions overlapping in the time domain with uplink control channel transmissions for the UE, wherein the third control signaling indicates a quantity of ports associated with the uplink shared channel transmission, and wherein transmitting at least one of the uplink control channel transmission or the uplink shared channel transmission is based at least in part on the maximum quantity of ports and the quantity of ports associated with the uplink shared channel transmission.

Aspect 3: The method of aspect 2, wherein the uplink shared channel transmission comprises a codebook based uplink shared channel transmission.

Aspect 4: The method of any of aspects 1 through 3, further comprising: determining that the quantity of layers associated with the uplink shared channel transmission exceeds the maximum quantity of layers; selecting a subset of layers of the quantity of layers based at least in part on the determining, wherein a second quantity of layers corresponding to the subset of layers corresponds to the maximum quantity of layers; and transmitting the uplink control channel transmission and the uplink shared channel transmission via the subset of layers.

Aspect 5: The method of aspect 4, wherein receiving the third control signaling comprises: receiving an indication of a set of SRS resources or a set of DMRS ports corresponding to the quantity of layers, and wherein selecting the subset of layers comprises selecting a subset of the set of SRS resources or a subset of the set of DMRS ports.

Aspect 6: The method of any of aspects 1 through 3, further comprising: determining that the quantity of layers associated with the uplink shared channel transmission exceeds the maximum quantity of layers, wherein transmitting at least one of the uplink control channel transmission or the uplink shared channel transmission comprises transmitting one of the uplink control channel transmission or the uplink shared channel transmission and dropping one of the uplink control channel transmission or the uplink shared channel transmission based at least in part on the determining.

Aspect 7: The method of aspect 6, further comprising: selecting to drop one of the uplink control channel transmission or the uplink shared channel transmission based at least in part on the one being associated with a fixed CORESET pool index, the one having a lower priority, the one being the uplink control channel transmission and carrying a channel state information report, the one being the uplink shared channel transmission and the uplink control channel transmission carrying hybrid automatic repeat request feedback information, the one being scheduled for transmission later in time, or the one being scheduled for periodic or semi-static transmission.

Aspect 8: The method of any of aspects 1 through 3, further comprising: determining that the quantity of layers associated with the uplink shared channel transmission exceeds the maximum quantity of layers; and multiplexing information associated with the uplink control channel transmission onto the uplink shared channel transmission based at least in part on the determining, wherein transmitting at least one of the uplink control channel transmission or the uplink shared channel transmission comprises transmitting the uplink shared channel transmission.

Aspect 9: The method of any of aspects 1 through 8, further comprising: determining, based at least in part on first communications resources associated with the uplink control channel transmission and second communications resources associated with the uplink shared channel transmission, that the uplink shared channel transmission at least partially overlaps in the time domain with the uplink control channel transmission, wherein the second control signaling indicates the first communications resources, wherein the third control signaling indicates the second communications resources, and wherein transmitting at least one of the uplink control channel transmission or the uplink shared channel transmission is based at least in part on the determining.

Aspect 10: The method of any of aspects 1 through 9, wherein receiving the third control signaling comprises: receiving an indication that the uplink shared channel transmission at least partially overlaps in the time domain with the uplink control channel transmission, wherein transmitting at least one of the uplink control channel transmission or the uplink shared channel transmission is based at least in part on the indication.

Aspect 11: The method of any of aspects 1 through 10, wherein communicating the first control signaling comprises: receiving the first control signaling from the network entity.

Aspect 12: The method of any of aspects 1 through 11, wherein communicating the first control signaling comprises: transmitting an indication of a UE capability corresponding to the maximum quantity of layers.

Aspect 13: The method of any of aspects 1 through 12, wherein the maximum quantity of layers comprises a total quantity of layers for uplink control channel transmissions and uplink shared channel transmissions, and the uplink control channel transmission is associated with one layer.

Aspect 14: A method for wireless communications at a network entity, comprising: communicating, with a UE, first control signaling indicating a maximum quantity of layers associated with uplink shared channel transmissions overlapping in the time domain with uplink control channel transmissions for the UE; transmitting, to the UE, second control signaling scheduling an uplink control channel transmission associated with a first CORESET pool index; transmitting, to the UE, third control signaling scheduling an uplink shared channel transmission associated with a second CORESET pool index, wherein the third control signaling indicates a quantity of layers associated with the uplink shared channel transmission, and wherein the uplink shared channel transmission at least partially overlaps in the time domain with the uplink control channel transmission; and receiving, from the UE, at least one of the uplink control channel transmission in accordance with the first CORESET pool index or the uplink shared channel transmission in accordance with the second CORESET pool index based at least in part on the maximum quantity of layers and the quantity of layers associated with the uplink shared channel transmission.

Aspect 15: The method of aspect 14, wherein communicating the first control signaling comprises: communicating an indication of a maximum quantity of ports associated with uplink shared channel transmissions overlapping in the time domain with uplink control channel transmissions for the UE, wherein the third control signaling indicates a quantity of ports associated with the uplink shared channel transmission, and wherein receiving at least one of the uplink control channel transmission or the uplink shared channel transmission is based at least in part on the maximum quantity of ports and the quantity of ports associated with the uplink shared channel transmission.

Aspect 16: The method of aspect 15, wherein the uplink shared channel transmission comprises a codebook based uplink shared channel transmission.

Aspect 17: The method of any of aspects 14 through 16, further comprising: receiving the uplink control channel transmission and the uplink shared channel transmission via a subset of layers of the quantity of layers, wherein the quantity of layers associated with the uplink shared channel transmission exceeds the maximum quantity of layers, and wherein a second quantity of layers corresponding to the subset of layers corresponds to the maximum quantity of layers.

Aspect 18: The method of aspect 17, wherein transmitting the third control signaling comprises: transmitting an indication of a set of SRS resources or a set of DMRS ports corresponding to the quantity of layers.

Aspect 19: The method of any of aspects 14 through 16, wherein receiving at least one of the uplink control channel transmission or the uplink shared channel transmission comprises: receiving one of the uplink control channel transmission or the uplink shared channel transmission, wherein the quantity of layers associated with the uplink shared channel transmission exceeds the maximum quantity of layers.

Aspect 20: The method of any of aspects 14 through 16, wherein receiving at least one of the uplink control channel transmission or the uplink shared channel transmission comprises: receiving the uplink shared channel transmission with information associated with the uplink control channel transmission multiplexed onto the uplink shared channel transmission, wherein the quantity of layers associated with the uplink shared channel transmission exceeds the maximum quantity of layers.

Aspect 21: The method of any of aspects 14 through 20, wherein transmitting the third control signaling comprises: transmitting an indication that the uplink shared channel transmission at least partially overlaps in the time domain with the uplink control channel transmission, wherein transmitting at least one of the uplink control channel transmission or the uplink shared channel transmission is based at least in part on the indication.

Aspect 22: The method of any of aspects 14 through 21, wherein communicating the first control signaling comprises: transmitting the first control signaling.

Aspect 23: The method of any of aspects 14 through 22, wherein communicating the first control signaling comprises: receiving an indication of a UE capability corresponding to the maximum quantity of layers.

Aspect 24: The method of any of aspects 14 through 23, wherein the maximum quantity of layers comprises a total quantity of layers for uplink control channel transmissions and uplink shared channel transmissions, and the uplink control channel transmission is associated with one layer.

Aspect 25: A UE comprising a processor; memory coupled with the processor; and instructions stored in the memory and executable by the processor to cause the UE to perform a method of any of aspects 1 through 13.

Aspect 26: An apparatus comprising at least one means for performing a method of any of aspects 1 through 13.

Aspect 27: A non-transitory computer-readable medium storing code the code comprising instructions executable by a processor to perform a method of any of aspects 1 through 13.

Aspect 28: A network entity, comprising a processor; memory coupled with the processor; and instructions stored in the memory and executable by the processor to cause the network entity to perform a method of any of aspects 14 through 24.

Aspect 29: An apparatus for wireless communications at a network entity, comprising at least one means for performing a method of any of aspects 14 through 24.

Aspect 30: A non-transitory computer-readable medium storing code for wireless communications at a network entity, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communications at a user equipment (UE), comprising:
   communicating, with a network entity, first control signaling indicating a maximum quantity of spatial layers on which the UE can communicate uplink shared channel transmissions overlapping in the time domain with uplink control channel transmissions;
   receiving, from the network entity, second control signaling scheduling an uplink control channel transmission associated with a first control resource set pool index;
   receiving, from the network entity, third control signaling scheduling an uplink shared channel transmission associated with a second control resource set pool index, wherein the third control signaling indicates a quantity of spatial layers associated with the scheduled uplink shared channel transmission, and wherein the scheduled uplink shared channel transmission at least partially overlaps in the time domain with the scheduled uplink control channel transmission; and
   transmitting at least one of the scheduled uplink control channel transmission in accordance with the first control resource set pool index or the scheduled uplink shared channel transmission in accordance with the second control resource set pool index based at least in part on the maximum quantity of spatial layers on which the UE can communicate and the quantity of spatial layers associated with the scheduled uplink shared channel transmission.

2. The method of claim 1, wherein communicating the first control signaling comprises:
   communicating an indication of a maximum quantity of ports on which the UE can communicate uplink shared channel transmissions overlapping in the time domain with uplink control channel transmissions, wherein the third control signaling indicates a quantity of ports associated with the scheduled uplink shared channel transmission, and wherein transmitting at least one of the scheduled uplink control channel transmission or the scheduled uplink shared channel transmission is based at least in part on the maximum quantity of ports on which the UE can communicate and the quantity of ports associated with the scheduled uplink shared channel transmission.

3. The method of claim 2, wherein the scheduled uplink shared channel transmission comprises a codebook based uplink shared channel transmission.

4. The method of claim 1, further comprising:
   determining that the quantity of spatial layers associated with the scheduled uplink shared channel transmission exceeds the maximum quantity of spatial layers;
   selecting a subset of spatial layers of the quantity of spatial layers based at least in part on the determining, wherein a second quantity of spatial layers corresponding to the subset of spatial layers corresponds to the maximum quantity of spatial layers; and
   transmitting the scheduled uplink control channel transmission and the scheduled uplink shared channel transmission via the subset of spatial layers.

5. The method of claim 4, wherein receiving the third control signaling comprises:
   receiving an indication of a set of sounding reference signal resources or a set of demodulation reference signal ports corresponding to the quantity of spatial layers, and wherein selecting the subset of spatial layers comprises selecting a subset of the set of sounding reference signal resources or a subset of the set of demodulation reference signal ports.

6. The method of claim 1, further comprising:
   determining that the quantity of spatial layers associated with the scheduled uplink shared channel transmission exceeds the maximum quantity of spatial layers, wherein transmitting at least one of the scheduled uplink control channel transmission or the scheduled uplink shared channel transmission comprises transmitting one of the scheduled uplink control channel transmission or the scheduled uplink shared channel transmission and dropping one of the scheduled uplink control channel transmission or the scheduled uplink shared channel transmission based at least in part on the determining.

7. The method of claim 6, further comprising:
selecting to drop one of the scheduled uplink control channel transmission or the scheduled uplink shared channel transmission based at least in part on the one being associated with a fixed control resource set pool index, the one having a lower priority, the one being the scheduled uplink control channel transmission and carrying a channel state information report, the one being the scheduled uplink shared channel transmission and the scheduled uplink control channel transmission carrying hybrid automatic repeat request feedback information, the one being scheduled for transmission later in time, or the one being scheduled for periodic or semi-static transmission.

8. The method of claim 1, further comprising:
determining that the quantity of spatial layers associated with the scheduled uplink shared channel transmission exceeds the maximum quantity of spatial layers; and
multiplexing information associated with the scheduled uplink control channel transmission onto the scheduled uplink shared channel transmission based at least in part on the determining, wherein transmitting at least one of the scheduled uplink control channel transmission or the scheduled uplink shared channel transmission comprises transmitting the scheduled uplink shared channel transmission.

9. The method of claim 1, further comprising:
determining, based at least in part on first communications resources associated with the scheduled uplink control channel transmission and second communications resources associated with the scheduled uplink shared channel transmission, that the scheduled uplink shared channel transmission at least partially overlaps in the time domain with the scheduled uplink control channel transmission, wherein the second control signaling indicates the first communications resources, wherein the third control signaling indicates the second communications resources, and wherein transmitting at least one of the scheduled uplink control channel transmission or the scheduled uplink shared channel transmission is based at least in part on the determining.

10. The method of claim 1, wherein receiving the third control signaling comprises:
receiving an indication that the scheduled uplink shared channel transmission at least partially overlaps in the time domain with the scheduled uplink control channel transmission, wherein transmitting at least one of the scheduled uplink control channel transmission or the scheduled uplink shared channel transmission is based at least in part on the indication.

11. The method of claim 1, wherein communicating the first control signaling comprises:
receiving the first control signaling from the network entity.

12. The method of claim 1, wherein communicating the first control signaling comprises:
transmitting an indication of a UE capability corresponding to the maximum quantity of spatial layers.

13. The method of claim 1, wherein:
the maximum quantity of spatial layers comprises a total quantity of spatial layers for uplink control channel transmissions and uplink shared channel transmissions, and
the scheduled uplink control channel transmission is associated with one layer.

14. A method for wireless communications at a network entity, comprising:
communicating, with a user equipment (UE), first control signaling indicating a maximum quantity of spatial layers on which the UE can communicate uplink shared channel transmissions overlapping in the time domain with uplink control channel transmissions;
transmitting, to the UE, second control signaling scheduling an uplink control channel transmission associated with a first control resource set pool index;
transmitting, to the UE, third control signaling scheduling an uplink shared channel transmission associated with a second control resource set pool index, wherein the third control signaling indicates a quantity of spatial layers associated with the scheduled uplink shared channel transmission, and wherein the scheduled uplink shared channel transmission at least partially overlaps in the time domain with the scheduled uplink control channel transmission; and
receiving, from the UE, at least one of the scheduled uplink control channel transmission in accordance with the first control resource set pool index or the scheduled uplink shared channel transmission in accordance with the second control resource set pool index based at least in part on the maximum quantity of spatial layers on which the UE can communicate and the quantity of spatial layers associated with the scheduled uplink shared channel transmission.

15. The method of claim 14, wherein communicating the first control signaling comprises:
communicating an indication of a maximum quantity of ports on which the UE can communicate uplink shared channel transmissions overlapping in the time domain with uplink control channel transmissions, wherein the third control signaling indicates a quantity of ports associated with the scheduled uplink shared channel transmission, and wherein receiving at least one of the scheduled uplink control channel transmission or the scheduled uplink shared channel transmission is based at least in part on the maximum quantity of ports on which the UE can communicate and the quantity of ports associated with the scheduled uplink shared channel transmission.

16. The method of claim 15, wherein the scheduled uplink shared channel transmission comprises a codebook based uplink shared channel transmission.

17. The method of claim 14, further comprising:
receiving the scheduled uplink control channel transmission and the scheduled uplink shared channel transmission via a subset of spatial layers of the quantity of spatial layers, wherein the quantity of spatial layers associated with the scheduled uplink shared channel transmission exceeds the maximum quantity of spatial layers, and wherein a second quantity of spatial layers corresponding to the subset of spatial layers corresponds to the maximum quantity of spatial layers.

18. The method of claim 17, wherein transmitting the third control signaling comprises:
transmitting an indication of a set of sounding reference signal resources or a set of demodulation reference signal ports corresponding to the quantity of spatial layers.

19. The method of claim 14, wherein receiving at least one of the scheduled uplink control channel transmission or the scheduled uplink shared channel transmission comprises:
receiving one of the scheduled uplink control channel transmission or the scheduled uplink shared channel transmission, wherein the quantity of spatial layers associated with the scheduled uplink shared channel transmission exceeds the maximum quantity of spatial layers.

20. The method of claim 14, wherein receiving at least one of the scheduled uplink control channel transmission or the scheduled uplink shared channel transmission comprises:
receiving the scheduled uplink shared channel transmission with information associated with the scheduled uplink control channel transmission multiplexed onto the scheduled uplink shared channel transmission, wherein the quantity of spatial layers associated with the scheduled uplink shared channel transmission exceeds the maximum quantity of spatial layers.

21. The method of claim 14, wherein transmitting the third control signaling comprises:
transmitting an indication that the scheduled uplink shared channel transmission at least partially overlaps in the time domain with the scheduled uplink control channel transmission, wherein transmitting at least one of the scheduled uplink control channel transmission or the scheduled uplink shared channel transmission is based at least in part on the indication.

22. The method of claim 14, wherein communicating the first control signaling comprises:
transmitting the first control signaling.

23. The method of claim 14, wherein communicating the first control signaling comprises:
receiving an indication of a UE capability corresponding to the maximum quantity of spatial layers.

24. The method of claim 14, wherein:
the maximum quantity of spatial layers comprises a total quantity of spatial layers for uplink control channel transmissions and uplink shared channel transmissions, and
the scheduled uplink control channel transmission is associated with one spatial layer.

25. A user equipment (UE), comprising:
a processor;
memory coupled with the processor; and
instructions stored in the memory and executable by the processor to cause the UE to:
communicate, with a network entity, first control signaling indicating a maximum quantity of spatial layers on which the UE can communicate uplink shared channel transmissions overlapping in the time domain with uplink control channel transmissions;
receive, from the network entity, second control signaling scheduling an uplink control channel transmission associated with a first control resource set pool index;
receive, from the network entity, third control signaling scheduling an uplink shared channel transmission associated with a second control resource set pool index, wherein the third control signaling indicates a quantity of spatial layers associated with the scheduled uplink shared channel transmission, and wherein the scheduled uplink shared channel transmission at least partially overlaps in the time domain with the scheduled uplink control channel transmission; and
transmit at least one of the scheduled uplink control channel transmission in accordance with the first control resource set pool index or the scheduled uplink shared channel transmission in accordance with the second control resource set pool index based at least in part on the maximum quantity of spatial layers on which the UE can communicate and the quantity of spatial layers associated with the scheduled uplink shared channel transmission.

26. The UE of claim 25, wherein the instructions to communicate the first control signaling are executable by the processor to cause the UE to:
communicate an indication of a maximum quantity of ports on which the UE can communicate uplink shared channel transmissions overlapping in the time domain with uplink control channel transmissions, wherein the third control signaling indicates a quantity of ports associated with the scheduled uplink shared channel transmission, and wherein transmitting at least one of the scheduled uplink control channel transmission or the scheduled uplink shared channel transmission is based at least in part on the maximum quantity of ports on which the UE can communicate and the quantity of ports associated with the scheduled uplink shared channel transmission.

27. The UE of claim 26, wherein the scheduled uplink shared channel transmission comprises a codebook based uplink shared channel transmission.

28. The UE of claim 25, wherein the instructions are further executable by the processor to cause the UE to:
determine that the quantity of spatial layers associated with the scheduled uplink shared channel transmission exceeds the maximum quantity of spatial layers;
select a subset of spatial layers of the quantity of spatial layers based at least in part on the determining, wherein a second quantity of spatial layers corresponding to the subset of spatial layers corresponds to the maximum quantity of spatial layers; and
transmit the scheduled uplink control channel transmission and the scheduled uplink shared channel transmission via the subset of spatial layers.

29. The UE of claim 28, wherein the instructions to receive the third control signaling are executable by the processor to cause the UE to:
receive an indication of a set of sounding reference signal resources or a set of demodulation reference signal ports corresponding to the quantity of spatial layers, and wherein selecting the subset of spatial layers comprises selecting a subset of the set of sounding reference signal resources or a subset of the set of demodulation reference signal ports.

30. A network entity, comprising:
a processor;
memory coupled with the processor; and
instructions stored in the memory and executable by the processor to cause the network entity to:
communicate, with a user equipment (UE), first control signaling indicating a maximum quantity of spatial layers on which the UE can communicate uplink shared channel transmissions overlapping in the time domain with uplink control channel transmissions;

transmit, to the UE, second control signaling scheduling an uplink control channel transmission associated with a first control resource set pool index;

transmit, to the UE, third control signaling scheduling an uplink shared channel transmission associated with a second control resource set pool index, wherein the third control signaling indicates a quantity of spatial layers associated with the scheduled uplink shared channel transmission, and wherein the scheduled uplink shared channel transmission at least partially overlaps in the time domain with the scheduled uplink control channel transmission; and receive, from the UE, at least one of the scheduled uplink control channel transmission in accordance with the first control resource set pool index or the scheduled uplink shared channel transmission in accordance with the second control resource set pool index based at least in part on the maximum quantity of spatial layers on which the UE can communicate and the quantity of spatial layers associated with the scheduled uplink shared channel transmission.

\* \* \* \* \*